United States Patent
Matsui et al.

(10) Patent No.: US 6,763,072 B1
(45) Date of Patent: Jul. 13, 2004

(54) METHOD AND APPARATUS FOR MODULATION AND DEMODULATION RELATED TO ORTHOGONAL FREQUENCY DIVISION MULTIPLEXING

(75) Inventors: Kazunari Matsui, Yokohama (JP); Katsumi Takaoka, Yokosuka (JP); Takaaki Saiki, Yokosuka (JP); Keiichi Kaneko, Atsugi (JP)

(73) Assignee: Victor Company of Japan, Ltd., Yokohama (JP)

( * ) Notice: Subject to any disclaimer, the term of this patent is extended or adjusted under 35 U.S.C. 154(b) by 686 days.

(21) Appl. No.: 09/634,856

(22) Filed: Aug. 8, 2000

(30) Foreign Application Priority Data

| Aug. 25, 1999 | (JP) | 11-238098 |
| Aug. 25, 1999 | (JP) | 11-238099 |
| Feb. 28, 2000 | (JP) | 2000-051192 |
| Feb. 28, 2000 | (JP) | 2000-051193 |

(51) Int. Cl.$^7$ ............................................. H04L 27/28
(52) U.S. Cl. ..................... 375/260; 375/261; 375/279; 375/281; 375/298
(58) Field of Search .............................. 375/260, 261, 375/279, 281, 295, 298; 370/208, 20; 655/59, 60

(56) References Cited

U.S. PATENT DOCUMENTS

| 5,841,813 | A | * | 11/1998 | van Nee | 375/279 |
| 6,304,611 | B1 | * | 10/2001 | Miyashita et al. | 375/260 |
| 6,459,679 | B1 | * | 10/2002 | Kim | 370/208 |
| 6,535,066 | B1 | * | 3/2003 | Petsko | 330/285 |

FOREIGN PATENT DOCUMENTS

| EP | 0760567 | 3/1997 |
| JP | 6-244883 | 9/1994 |
| JP | 08051466 | 2/1996 |
| JP | 8-102766 | 4/1996 |
| JP | 8-149167 | 6/1996 |
| JP | 10-304001 | 11/1998 |
| JP | 11-55336 | 2/1999 |
| JP | 11-168521 | 6/1999 |

OTHER PUBLICATIONS

Samueli H et al: "VLSI architectures for a high-speed tunable digital modulator/demodulator/bandpass–filter chip set" Proceedings of the International Symposium on Circuits and Systems. San Diego, May 10–13, 1992, Proceedings of the International Symposium on Circuits and Systems. (ISCAS), New York, IEEE, US, vol. 4 CONF. 25, May 3, 1992, pp. 1065–1068, XP 010061417 ISBN: 0–7803–0593–0.

* cited by examiner

*Primary Examiner*—Shuwang Liu
(74) *Attorney, Agent, or Firm*—Louis Woo

(57) ABSTRACT

Data pieces representative of in-phase components and quadrature components of a digital-modulation-resultant signal are assigned to frequencies for inverse fast Fourier transform. The inverse fast Fourier transform is executed at a predetermined sampling frequency Fs to convert the data pieces into a real-part signal and an imaginary-part signal. Phases of the real-part signal and the imaginary-part signal are shifted. Each of the phase-shifted real-part signal and the phase-shifted imaginary-part signal is divided into a sequence of even-numbered samples and a sequence of odd-numbered samples. A digital quadrature-modulation-resultant signal is generated from further manipulation of the even-numbered and odd-numbered samples.

4 Claims, 15 Drawing Sheets

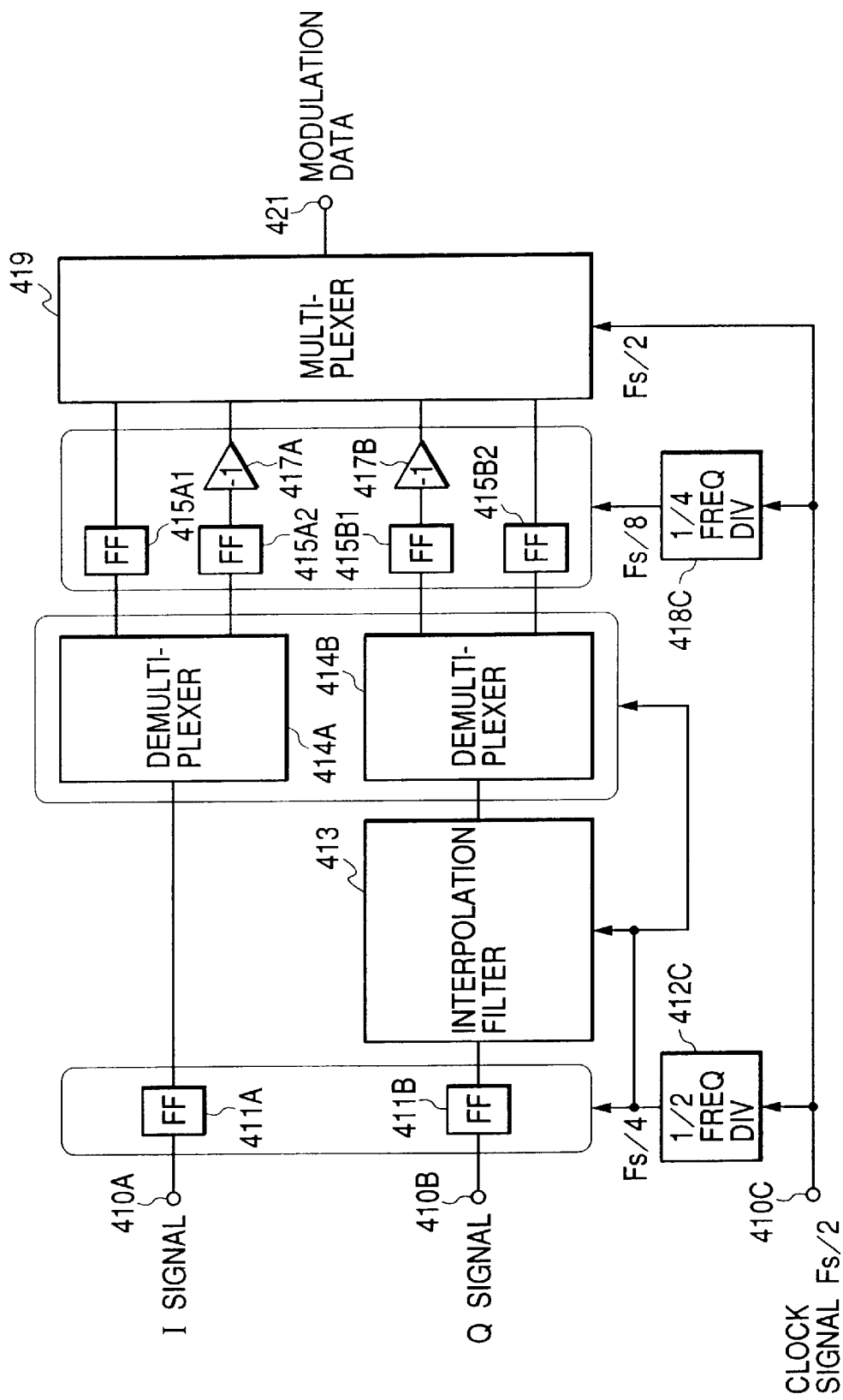

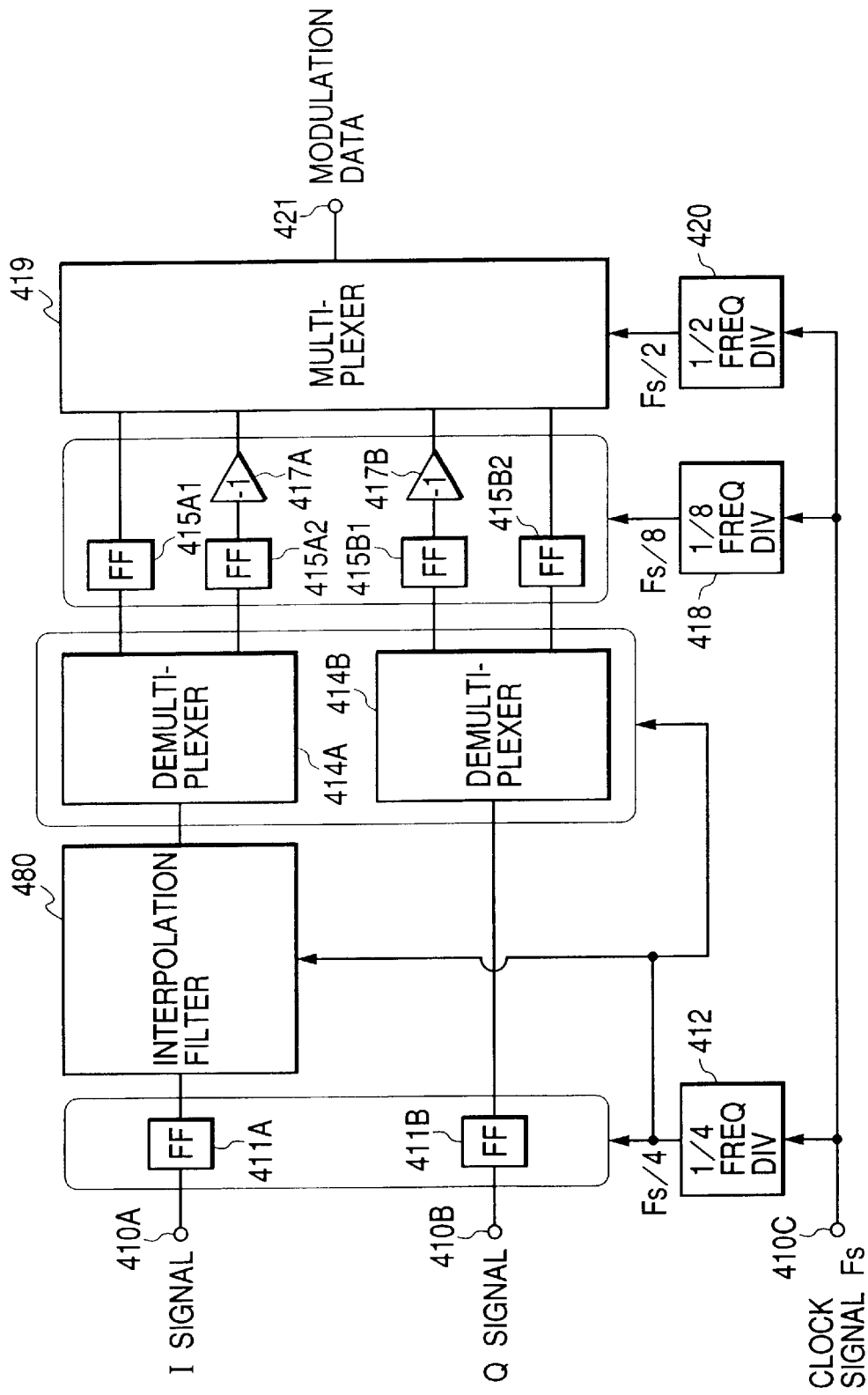

METHOD AND APPARATUS FOR MODULATION AND DEMODULATION RELATED TO ORTHOGONAL FREQUENCY DIVISION MULTIPLEXING

BACKGROUND OF THE INVENTION

1. Field of the Invention

This invention relates to a method and an apparatus for modulation based on orthogonal frequency division multiplexing (OFDM). In addition, this invention relates to a method and an apparatus for demodulation concerning OFDM. Furthermore, this invention relates a method and an apparatus for digital quadrature modulation. Also, this invention relates to a method and an apparatus for digital quadrature demodulation.

2. Description of the Related Art

In orthogonal frequency division multiplexing (OFDM), digital in-phase (I) signals and digital quadrature (Q) signals resulting from a QAM-corresponding process or a QPSK-corresponding process are assigned to respective orthogonal frequencies for IDFT or IFFT. Here, QAM is short for quadrature amplitude modulation, and QPSK is short for quadrature phase shift keying. In addition, IDFT is short for inverse discrete Fourier transform, and IFFT is short for inverse fast Fourier transform. The IDFT or IFFT is executed while the I signals are set as real-part terms and the Q signals are set as imaginary-part terms. By the IDFT or IFFT, the I signals are converted and combined into a digital multiplexing-resultant I signal, and the Q signals are converted and combined into a digital multiplexing-resultant Q signal. The digital multiplexing-resultant I and Q signals are changed into analog forms. The analog I and Q signals are combined and converted into an RF multiple-carrier signal in a desired frequency band. The RF multiple-carrier signal is transmitted as a radio wave.

A prior-art apparatus for modulation based on OFDM requires a relatively-high sampling frequency. Therefore, the prior-art modulation apparatus uses parts which can accurately operate even at high frequencies. Such parts are expensive.

A prior-art apparatus for demodulation concerning OFDM requires a relatively-high sampling frequency. Therefore, the prior-art demodulation apparatus uses parts which can accurately operate even at high frequencies. Such parts are expensive.

SUMMARY OF THE INVENTION

It is a first object of this invention to provide an improved method of modulation based on orthogonal frequency division multiplexing (OFDM).

It is a second object of this invention to provide an improved apparatus for modulation based on OFDM.

It is a third object of this invention to provide an improved method of demodulation concerning OFDM.

It is a fourth object of this invention to provide an improved apparatus for demodulation concerning OFDM.

It is a fifth object of this invention to provide an improved digital quadrature modulation apparatus.

It is a sixth object of this invention to provide an improved method of digital quadrature modulation.

It is a seventh object of this invention to provide an improved digital quadrature demodulation apparatus.

It is an eighth object of this invention to provide an improved method of digital quadrature demodulation.

It is a ninth object of this invention to provide an improved digital quadrature modulator.

A first aspect of this invention provides a method of modulation based on orthogonal frequency division multiplexing. The method comprises the steps of assigning data pieces representative of in-phase components and quadrature components of a digital-modulation-resultant signal to frequencies for inverse fast Fourier transform; executing the inverse fast Fourier transform at a predetermined sampling frequency Fs to convert the data pieces into a real-part signal and an imaginary-part signal; shifting phases of the real-part signal and the imaginary-part signal to convert the real-part signal and the imaginary-part signal into a phase-shifted real-part signal and a phase-shifted imaginary-part signal; dividing the phase-shifted real-part signal into a sequence of even-numbered samples and a sequence of odd-numbered samples; dividing the phase-shifted imaginary-part signal into a sequence of even-numbered samples and a sequence of odd-numbered samples; multiplying the sequence of the phase-shifted even-numbered samples of the real-part signal by "1" to generate a first multiplication-result signal I(2n); multiplying the sequence of the even-numbered samples of the phase-shifted imaginary-part signal by "−1" to generate a second multiplication-result signal −Q(2n); multiplying the sequence of the odd-numbered samples of the phase-shifted real-part signal by "−1" to generate a third multiplication-result signal −I(2n+1); multiplying the sequence of the odd-numbered samples of the phase-shifted imaginary-part signal by "1" to generate a fourth multiplication-result signal Q(2n+1); sequentially selecting the first multiplication-result signal I(2n), the second multiplication-result signal −Q(2n), the third multiplication-result signal −I(2n+1), and the fourth multiplication-result signal Q(2n+1) at a frequency equal to twice the predetermined sampling frequency Fs to generate a digital quadrature-modulation-resultant signal; and converting the digital quadrature-modulation-resultant signal into an analog quadrature-modulation-resultant signal at a frequency equal to twice the predetermined sampling frequency Fs.

A second aspect of this invention is based on the first aspect thereof, and provides a method wherein the sequentially selecting step comprises inputting the first multiplication-result signal I(2n), the second multiplication-result signal −Q(2n), the third multiplication-result signal −I(2n+1), and the fourth multiplication-result signal Q(2n+1) into shift registers respectively at a frequency equal to half the predetermined sampling frequency Fs; and sequentially selecting output signals from the shift registers at a frequency equal to twice the predetermined sampling frequency Fs to generate the digital quadrature-modulation-resultant signal.

A third aspect of this invention provides an apparatus for modulation based on orthogonal frequency division multiplexing. The apparatus comprises means for assigning data pieces representative of in-phase components and quadrature components of a digital-modulation-resultant signal to frequencies for inverse fast Fourier transform; means for executing the inverse fast Fourier transform at a predetermined sampling frequency Fs to convert the data pieces into a real-part signal and an imaginary-part signal; means for shifting phases of the real-part signal and the imaginary-part signal to convert the real-part signal and the imaginary-part signal into a phase-shifted real-part signal and a phase-shifted imaginary-part signal; means for dividing the phase-shifted real-part signal into a sequence of even-numbered samples and a sequence of odd-numbered samples; means for dividing the phase-shifted imaginary-part signal into a sequence of even-numbered samples and a sequence of odd-numbered samples; a multiplier for multiplying the sequence of the even-numbered samples of the phase-shifted real-part signal by "1" to generate a first multiplication-result signal I(2n); a multiplier for multiplying the sequence of the even-numbered samples of the phase-shifted imaginary-part signal by "−1" to generate a second multiplication-result signal −Q(2n); a multiplier for multiplying the sequence of the odd-numbered samples of the phase-shifted real-part signal by "−1" to generate a third multiplication-result signal −I(2n+1); a multiplier for multiplying the sequence of the odd-numbered samples of the phase-shifted imaginary-part signal by "1" to generate a fourth multiplication-result signal Q(2n+1); means for sequentially selecting the first multiplication-result signal I(2n), the second multiplication-result signal −Q(2n), the third multiplication-result signal −I(2n+1), and the fourth multiplication-result signal Q(2n+1) at a frequency equal to twice the predetermined sampling frequency Fs to generate a digital quadrature-modulation-resultant signal; and a D/A converter for converting the digital quadrature-modulation-resultant signal into an analog quadrature-modulation-resultant signal at a frequency equal to twice the predetermined sampling frequency Fs.

A fourth aspect of this invention is based on the third aspect thereof, and provides an apparatus wherein the sequentially selecting means comprises shift registers; means for inputting the first multiplication-result signal I(2n), the second multiplication-result signal −Q(2n), the third multiplication-result signal −I(2n+1), and the fourth multiplication-result signal Q(2n+1) into the shift registers respectively at a frequency equal to half the predetermined sampling frequency Fs; and a data selector for sequentially selecting output signals from the shift registers at a frequency equal to twice the predetermined sampling frequency Fs to generate the digital quadrature-modulation-resultant signal.

A fifth aspect of this invention provides a method of demodulating an OFDM (orthogonal frequency division multiplexed) signal. The method comprises the steps of converting an RF OFDM signal into an analog OFDM signal in a frequency band centered at a half of a predetermined sampling frequency Fs; converting the analog OFDM signal into a digital OFDM signal at a frequency equal to twice the predetermined sampling frequency Fs; sequentially separating samples of the digital OFDM signal into a sequence of first every four samples, a sequence of second every four samples, a sequence of third every four samples, and a sequence of fourth every four samples; multiplying the sequence of the first every four samples of the digital OFDM signal by "1" to generate a first multiplication-result signal I(2n); multiplying the sequence of the second every four samples of the digital OFDM signal by "−1" to generate a second multiplication-result signal −Q(2n); multiplying the sequence of the third every four samples of the digital OFDM signal by "−1" to generate a third multiplication-result signal −I(2n+1); multiplying the sequence of the fourth every four samples of the digital OFDM signal by "1" to generate a fourth multiplication-result signal Q(2n+1); generating a quadrature-demodulation-resultant in-phase signal in response to the first multiplication-result signal I(2n) and the third multiplication-result signal −I(2n+1); generating a quadrature-demodulation-resultant quadrature signal in response to the second multiplication-result signal −Q(2n) and the fourth multiplication-result signal Q(2n+1); equalizing phases of the quadrature-demodulation-resultant in-phase signal and the quadrature-demodulation-resultant quadrature signal to generate a pair of equal-phase in-phase and quadrature signals; and subjecting the pair of the equal-phase in-phase and quadrature signals to fast Fourier transform at a frequency equal to the predetermined sampling frequency to convert the pair of the equal-phase in-phase and quadrature signals into real-part data and imaginary-part data.

A sixth aspect of this invention provides an apparatus for demodulating an OFDM (orthogonal frequency division multiplexed) signal. The apparatus comprises a frequency converter for converting an RF OFDM signal into an analog OFDM signal in a frequency band centered at a half of a predetermined sampling frequency Fs; an A/D converter for converting the analog OFDM signal into a digital OFDM signal at a frequency equal to twice the predetermined sampling frequency Fs; means for sequentially separating samples of the digital OFDM signal into a sequence of first every four samples, a sequence of second every four samples, a sequence of third every four samples, and a sequence of fourth every four samples; a multiplier for multiplying the sequence of the first every four samples of the digital OFDM signal by "1" to generate a first multiplication-result signal I(2n); a multiplier for multiplying the sequence of the second every four samples of the digital OFDM signal by "−1" to generate a second multiplication-result signal −Q(2n); a multiplier for multiplying the sequence of the third every four samples of the digital OFDM signal by "−1" to generate a third multiplication-result signal −I(2n+1); a multiplier for multiplying the sequence of the fourth every four samples of the digital OFDM signal by "1" to generate a fourth multiplication-result signal Q(2n+1); means for generating a quadrature-demodulation-resultant in-phase signal in response to the first multiplication-result signal I(2n) and the third multiplication-result signal −I(2n+1); means for generating a quadrature-demodulation-resultant quadrature signal in response to the second multiplication-result signal −Q(2n) and the fourth multiplication-result signal Q(2n+1); means for equalizing phases of the quadrature-demodulation-resultant in-phase signal and the quadrature-demodulation-resultant quadrature signal to generate a pair of equal-phase in-phase and quadrature signals; and means for subjecting the pair of the equal-phase in-phase and quadrature signals to fast Fourier transform at a frequency equal to the predetermined sampling frequency to convert the pair of the equal-phase in-phase and quadrature signals into real-part data and imaginary-part data.

A seventh aspect of this invention provides a digital quadrature modulation apparatus comprising means for generating N-point multiple-carrier signals having a predetermined sampling frequency Fs and being in a frequency band whose center frequency is equal to 0 Hz, the N-point multiple-carrier signals being in sets each having an in-phase component and a quadrature component, where N denotes a predetermined natural number; means for subjecting the N-point multiple-carrier signals to inverse fast Fourier transform to generate a discrete in-phase signal I and a discrete quadrature signal Q defined in a time domain; means for selecting samples I(2n) and I(2n+1) of the discrete in-phase signal I and samples Q(2n) and Q(2n+1) of the discrete quadrature signal Q, where n=0, 1, 2, . . . , N/2; means for multiplying the selected sample I(2n+1) by "−1" to generate a sample −I(2n+1); means for multiplying the selected sample Q(2n) by "−1" to generate a sample −Q(2n); and means for rearranging the samples I(2n), −I(2n+1), −Q(2n), and Q(2n+1) in an order as I(2n), −Q(2n), −I(2n+1), and Q(2n+1) to generate a quadrature-modulation-resultant signal having a sampling frequency equal to twice the predetermined sampling frequency Fs and being in a frequency band whose center frequency is equal to a half of the predetermined sampling frequency Fs.

An eighth aspect of this invention provides a method of digital quadrature modulation. The method comprises the steps of generating N-point multiple-carrier signals having a predetermined sampling frequency Fs and being in a frequency band whose center frequency is equal to 0 Hz, the N-point multiple-carrier signals being in sets each having an in-phase component and a quadrature component, where N denotes a predetermined natural number; subjecting the N-point multiple-carrier signals to inverse fast Fourier transform to generate a discrete in-phase signal I and a discrete quadrature signal Q defined in a time domain; selecting samples I(2n) and I(2n+1) of the discrete in-phase signal I and samples Q(2n) and Q(2n+1) of the discrete quadrature signal Q, where n=0, 1, 2, . . . , N/2; multiplying the selected sample I(2n+1) by "−1" to generate a sample −I(2n+1); multiplying the selected sample Q(2n) by "−1" to generate a sample −Q(2n); and rearranging the samples I(2n), −I(2n+1), −Q(2n), and Q(2n+1) in an order as I(2n), −Q(2n), −I(2n+1), and Q(2n+1) to generate a quadrature-modulation-resultant signal having a sampling frequency equal to twice the predetermined sampling frequency Fs and being in a frequency band whose center frequency is equal to a half of the predetermined sampling frequency Fs.

A ninth aspect of this invention provides a digital quadrature demodulation apparatus for demodulating a quadrature-modulation-resultant signal generated by the digital quadrature modulation apparatus according to the seventh aspect of this invention. The digital quadrature demodulation apparatus comprises means for selecting four successive samples of 2N-point discrete data being a quadrature-modulation-resultant signal which has a sampling frequency equal to twice the predetermined sampling frequency Fs and which is in a frequency band whose center frequency is equal to a half of the predetermined sampling frequency Fs; and means for sequentially assigning the selected four successive samples to a sample I(2n) of an in-phase signal, an inversion −Q(2n) of a sample Q(2n) of a quadrature signal, an inversion −I(2n+1) of a sample I(2n+1) of the in-phase signal, and a sample Q(2n+1) of the quadrature signal, respectively, wherein each of the in-phase signal and the quadrature signal has N points and is in a frequency band whose center frequency is equal to 0 Hz.

A tenth aspect of this invention provides a method of demodulating a quadrature-modulation-resultant signal generated by the method according to the eighth aspect of this invention. The demodulating method comprises the steps of selecting four successive samples of 2N-point discrete data being a quadrature-modulation-resultant signal which has a sampling frequency equal to twice the predetermined sampling frequency Fs and which is in a frequency band whose center frequency is equal to a half of the predetermined sampling frequency Fs; and sequentially assigning the selected four successive samples to a sample I(2n) of an in-phase signal, an inversion −Q(2n) of a sample Q(2n) of a quadrature signal, an inversion −I(2n+1) of a sample I(2n+1) of the in-phase signal, and a sample Q(2n+1) of the quadrature signal, respectively, wherein each of the in-phase signal and the quadrature signal has N points and is in a frequency band whose center frequency is equal to 0 Hz.

An eleventh aspect of this invention provides a digital quadrature modulator comprising an interpolation filter for generating second samples of an N-point quadrature signal from original samples of the quadrature signal by an interpolation process, where N denotes a predetermined natural number, the second samples being at centers between positions of the original samples; a first demultiplexer for separating samples of an N-point in-phase signal into a sequence of even-numbered samples and a sequence of odd-numbered samples, wherein the sequence of the even-numbered samples of the in-phase signal compose a signal I(2n); a second demultiplexer for separating the second samples of the quadrature signal into a sequence of even-numbered samples and a sequence of odd-numbered samples, wherein the sequence of the odd-numbered samples of the quadrature signal compose a signal Q(2n+1); a first multiplier for multiplying the sequence of the odd-numbered samples of the in-phase signal by "−1" to generate a signal −I(2n+1); a second multiplier for multiplying the sequence of the even-numbered samples of the quadrature signal by "−1" to generate a signal −Q(2n); and a parallel-to-serial converter for sequentially selecting and outputting the signal I(2n), the signal −Q(2n), the signal −I(2n+1), and the signal Q(2n+1) to generate a 2N-point digital quadrature-modulation-resultant signal.

A twelfth aspect of this invention provides a digital quadrature modulator comprising an interpolation filter for generating second samples of an N-point in-phase signal from original samples of the in-phase signal by an interpolation process, where N denotes a predetermined natural number, the second samples being at centers between positions of the original samples; a first demultiplexer for separating the second samples of the in-phase signal into a sequence of even-numbered samples and a sequence of odd-numbered samples, wherein the sequence of the even-numbered samples of the in-phase signal compose a signal I(2n); a second demultiplexer for separating samples of an N-point quadrature signal into a sequence of even-numbered samples and a sequence of odd-numbered samples, wherein the sequence of the odd-numbered samples of the quadrature signal compose a signal Q(2n+1); a first multiplier for multiplying the sequence of the odd-numbered samples of the in-phase signal by "−1" to generate a signal −I(2n+1); a second multiplier for multiplying the sequence of the even-numbered samples of the quadrature signal by "−1" to generate a signal −Q(2n); and a parallel-to-serial converter for sequentially selecting and outputting the signal I(2n), the signal −Q(2n), the signal −I(2n+1), and the signal Q(2n+1) to generate a 2N-point digital quadrature-modulation-resultant signal.

A thirteenth aspect of this invention is based on the eleventh aspect thereof, and provides a digital quadrature modulator wherein the interpolation filter comprises a half band filter.

A fourteenth aspect of this invention provides a method of digital quadrature modulation. The method comprises the steps of generating second samples of an N-point quadrature signal from original samples of the quadrature signal by an interpolation process, where N denotes a predetermined natural number, the second samples being at centers between positions of the original samples; separating samples of an N-point in-phase signal into a sequence of even-numbered samples and a sequence of odd-numbered samples, wherein the sequence of the even-numbered samples of the in-phase signal compose a signal I(2n); separating the second samples of the quadrature signal into a sequence of even-numbered samples and a sequence of odd-numbered samples, wherein the sequence of the odd-numbered samples of the quadrature signal compose a signal Q(2n+1); multiplying the sequence of the odd-numbered samples of the in-phase signal by "−1" to generate a signal −I(2n+1); multiplying the sequence of the even-numbered samples of the quadrature signal by "−1" to generate a signal −Q(2n); and sequentially selecting and outputting the signal I(2n), the signal −Q(2n), the signal −I(2n+1), and the signal Q(2n+1) to generate a 2N-point digital quadrature-modulation-resultant signal.

A fifteenth aspect of this invention provides a method of digital quadrature modulation. The method comprises the steps of generating second samples of an N-point in-phase signal from original samples of the in-phase signal by an interpolation process, where N denotes a predetermined natural number, the second samples being at centers between positions of the original samples; separating the second samples of the in-phase signal into a sequence of even-numbered samples and a sequence of odd-numbered samples, wherein the sequence of the even-numbered samples of the in-phase signal compose a signal I(2n); separating samples of an N-point quadrature signal into a sequence of even-numbered samples and a sequence of odd-numbered samples, wherein the sequence of the odd-numbered samples of the quadrature signal compose a signal Q(2n+1); multiplying the sequence of the odd-numbered samples of the in-phase signal by "−1" to generate a signal −I(2n+1); multiplying the sequence of the even-numbered samples of the quadrature signal by "−1" to generate a signal −Q(2n); and sequentially selecting and outputting the signal I(2n), the signal −Q(2n), the signal −I(2n+1), and the signal Q(2n+1) to generate a 2N-point digital quadrature-modulation-resultant signal.

BRIEF DESCRIPTION OF THE DRAWINGS

FIG. 14 is a block diagram of a digital quadrature modulator according to a sixth embodiment of this invention.

FIG. 15 is a block diagram of a digital quadrature modulator according to a seventh embodiment of this invention.

DESCRIPTION OF THE PREFERRED EMBODIMENTS

A prior-art OFDM (orthogonal frequency division multiplexing) modulation apparatus will be explained below for a better understanding of this invention.

Figure 1:
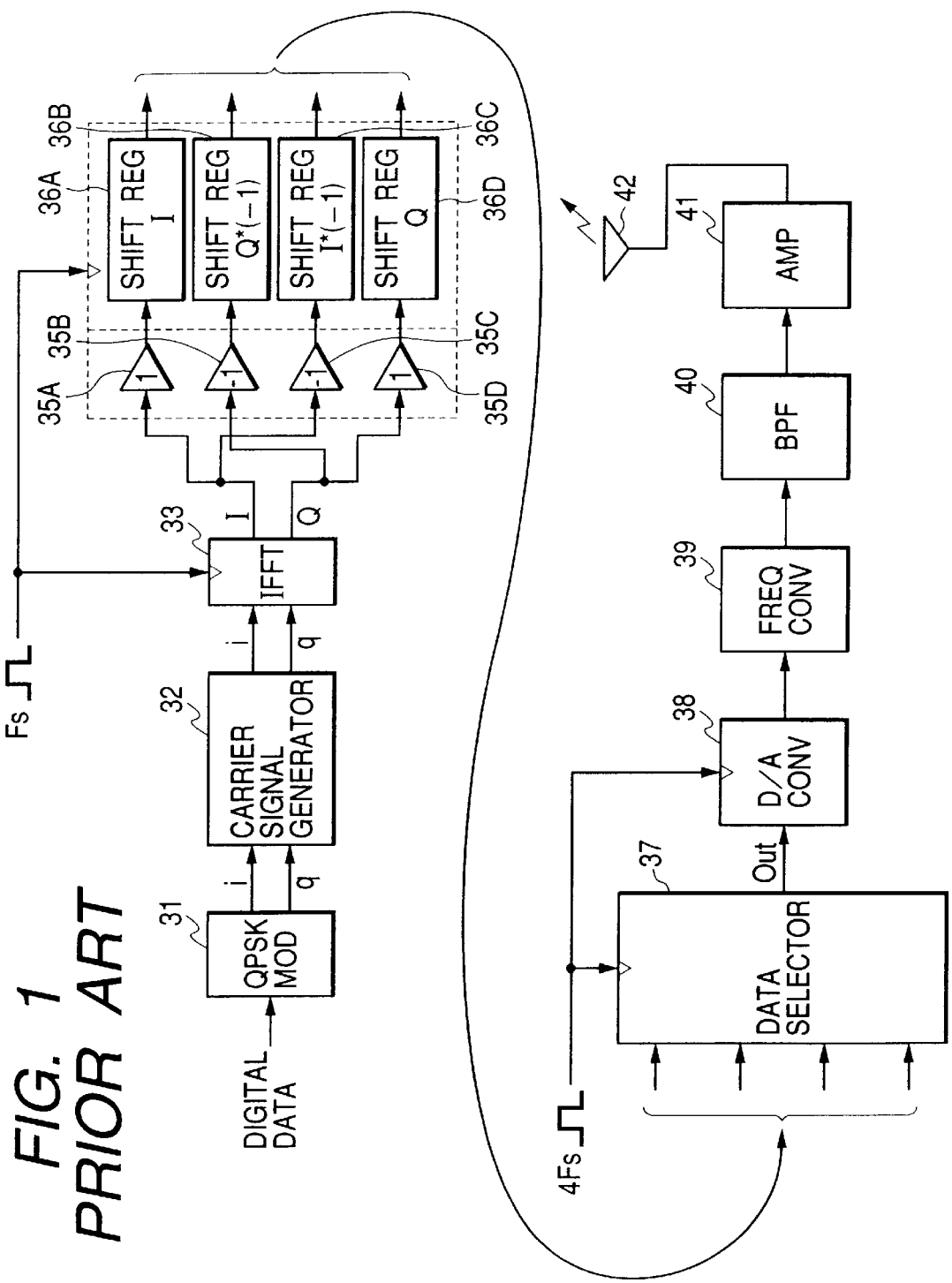
FIG. 1 is a block diagram of a prior-art OFDM modulation apparatus.

FIG. 1 shows a prior-art OFDM modulation apparatus. The prior-art apparatus of FIG. 1 includes a QPSK modulator 31 receiving original digital data to be transmitted. The QPSK modulator 31 subjects the original digital data to processing which corresponds to QPSK modulation. The QPSK modulator 31 converts the original digital data into digital I (in-phase) signals and digital Q (quadrature) signals. A carrier signal generator 32 receives the digital I signals and the digital Q signals from the QPSK modulator 31. The carrier signal generator 32 arranges the digital I signals and the digital Q signals in a frequency domain. Specifically, the carrier signal generator 32 assigns the digital I signals and the digital Q signals to frequencies (orthogonal baseband carrier frequencies) for IFFT. The carrier signal generator 32 outputs the arrangement-resultant digital I signals and the arrangement-resultant digital Q signals to an IFFT section 33.

In the prior-art apparatus of FIG. 1, the IFFT section 33 implements IFFT (inverse fast Fourier transform) while setting the arrangement-resultant digital I signals as real-part terms and setting the arrangement-resultant digital Q signals as imaginary-part terms. The IFFT section 33 converts and combines the arrangement-resultant digital I signals into an IFFT-resultant digital I signal. In addition, the IFFT section 33 converts and combines the arrangement-resultant digital Q signals into an IFFT-resultant digital Q signal.

The prior-art apparatus of FIG. 1 includes multipliers 35A, 35B, 35C, and 35D, shift registers 36A, 36B, 36C, and 36D, and a data selector 37 which compose a digital quadrature modulator.

The multiplier 35A receives the IFFT-resultant digital I signal from the IFFT section 33, and multiplies the IFFT-resultant digital I signal by "1". The multiplier 35A outputs the multiplication-resultant digital signal to the shift register 36A. The shift register 36A temporarily stores and holds the digital signal from the multiplier 35A. Thus, the output digital signal of the multiplier 35A passes through the shift register 36A while being delayed thereby. In addition, the multiplier 35B receives the IFFT-resultant digital Q signal from the IFFT section 33, and multiplies the IFFT-resultant digital Q signal by "−1". The multiplier 35B outputs the multiplication-resultant digital signal to the shift register 36B. The shift register 36B temporarily stores and holds the digital signal from the multiplier 35B. Thus, the output digital signal of the multiplier 35B passes through the shift register 36B while being delayed thereby. Furthermore, the multiplier 35C receives the IFFT-resultant digital I signal from the IFFT section 33, and multiplies the IFFT-resultant digital I signal by "−1". The multiplier 35C outputs the multiplication-resultant digital signal to the shift register 36C. The shift register 36C temporarily stores and holds the digital signal from the multiplier 35C. Thus, the output digital signal of the multiplier 35C passes through the shift register 36C while being delayed thereby. In addition, the multiplier 35D receives the IFFT-resultant digital Q signal from the IFFT section 33, and multiplies the IFFT-resultant digital Q signal by "1". The multiplier 35D outputs the multiplication-resultant digital signal to the shift register 36D. The shift register 36D temporarily stores and holds the digital signal from the multiplier 35D. Thus, the output digital signal of the multiplier 35D passes through the shift register 36D while being delayed thereby.

In the prior-art apparatus of FIG. 1, the data selector 37 receives the output digital signals from the shift registers 36A, 36B, 36C, and 36D. The data selector 37 sequentially and cyclically selects one from among the output digital signals of the shift registers 36A, 36B, 36C, and 36D. The selection order in every cycle is as follows: "I" (the output digital signal of the shift register 36A), "-Q" (the output digital signal of the shift register 36B), "-I" (the output digital signal of the shift register 36C), and "Q" (the output digital signal of the shift register 36D). The data selector 37 outputs the selection-resultant digital signal to a D/A converter 38. The D/A converter 38 changes the output digital signal of the data selector 37 into a corresponding analog baseband multiple-carrier signal. The D/A converter 37 outputs the analog baseband multiple-carrier signal to a frequency converter 39. The frequency converter 39 changes the analog baseband multiple-carrier signal into a corresponding RF multiple-carrier signal (a corresponding RF OFDM signal). The RF multiple-carrier signal is transmitted from the frequency converter 39 to an RF power amplifier 41 via a band-pass filter (BPF) 40 tuned to pass only signal components in a desired frequency band. The device 41 amplifies the RF multiple-carrier signal. The amplifier 41 feeds the amplification-resultant RF multiple-carrier signal to an antenna 42. The amplification-resultant RF multiple-carrier signal (the amplification-resultant RF OFDM signal) is radiated by the antenna 42.

Figure 2:
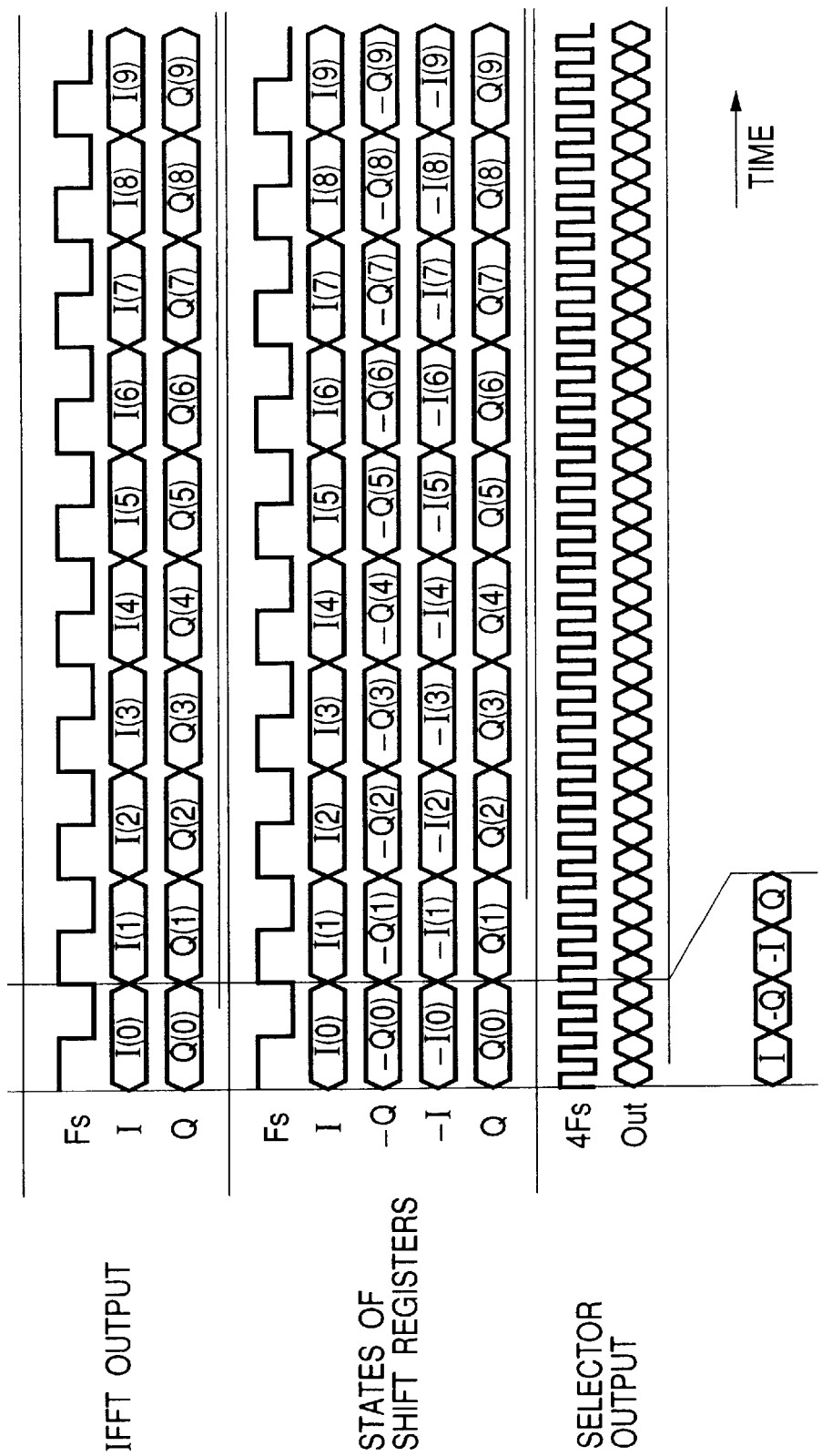
FIG. 2 is a time-domain diagram of signals in the apparatus of FIG. 1.

With reference to FIGS. 1 and 2, the IFFT section 33 operates at a low sampling frequency Fs provided by a low-frequency clock pulse signal. Accordingly, the states of the IFFT-resultant digital I and Q signals repetitively change at a period corresponding to the low sampling frequency Fs. The shift registers 36A, 36B, 36C, and 36D also operate at the low sampling frequency Fs. Therefore, the states of the output digital signals from the shift registers 36A, 36B, 36C, and 36D repetitively change at a period corresponding to the low sampling frequency Fs. On the other hand, the data selector 37 operates at a high sampling frequency 4Fs provided by a high-frequency clock pulse signal. The high sampling frequency 4Fs is equal to four times the low sampling frequency Fs. For every cycle equal to the period corresponding to the low sampling frequency Fs, the data selector 37 sequentially selects the output digital signal from the shift register 36A, the output digital signal from the shift register 36B, the output digital signal from the shift register 36C, and the output digital signal from the shift register 36D in that order (the order as "I→-Q→-I→Q"). The D/A converter 38 also operates at the high sampling frequency 4Fs.

In the case where discrete data with 1024 points are transmitted according to OFDM at a symbol rate of 20 µs, the low sampling frequency Fs for the IFFT section 33 and the shift registers 36A–36D is given as follows.

$$Fs=1/\{(20 \cdot 10^{-6})/1024\}=51.2 \text{(MHz)}$$

In this case, the high sampling frequency 4Fs for the data selector 37 and the D/A converter 38 is equal to 204.8 MHz. Thus, in the prior-art apparatus of FIG. 1, the data selector 37 and the D/A converter 38 are required to accurately operate even at a high sampling frequency. Therefore, the data selector 37 and the D/A converter 38 are expensive.

In the prior-art apparatus of FIG. 1, the multipliers 35A–35D, the shift registers 36A–36D, and the data selector 37 cooperate to implement digital quadrature modulation which combines the IFFT-resultant digital I and Q signals into a single quadrature-modulation-resultant digital signal (the output digital signal from the data selector 37). The digital quadrature modulation virtually uses a digital sine wave and a digital cosine wave having a frequency equal to the low sampling frequency Fs. The digital sine wave periodically changes as "0"→"1"→"0"→"-1". The digital cosine wave periodically changes as "1"→"0"→"-1"→"0". The digital sine wave and the digital cosine wave result from periodically sampling an analog sine wave and an analog cosine wave at a frequency (the high sampling frequency 4Fs) equal to four times the low sampling frequency Fs for the IFFT section 33. The multiplications by the multipliers 35A–35D correspond to the multiplications among the IFFT-resultant digital I and Q signals, the digital sine wave, and the digital cosine wave for the digital quadrature modulation. For every cycle equal to the period corresponding to the low sampling frequency Fs, the data selector 37 sequentially selects the output digital signals from the shift registers 36A–36D in response to the high-frequency clock pulse signal providing the high sampling frequency 4Fs.

A prior-art OFDM demodulation apparatus will be explained below for a better understanding of this invention.

Figure 3:
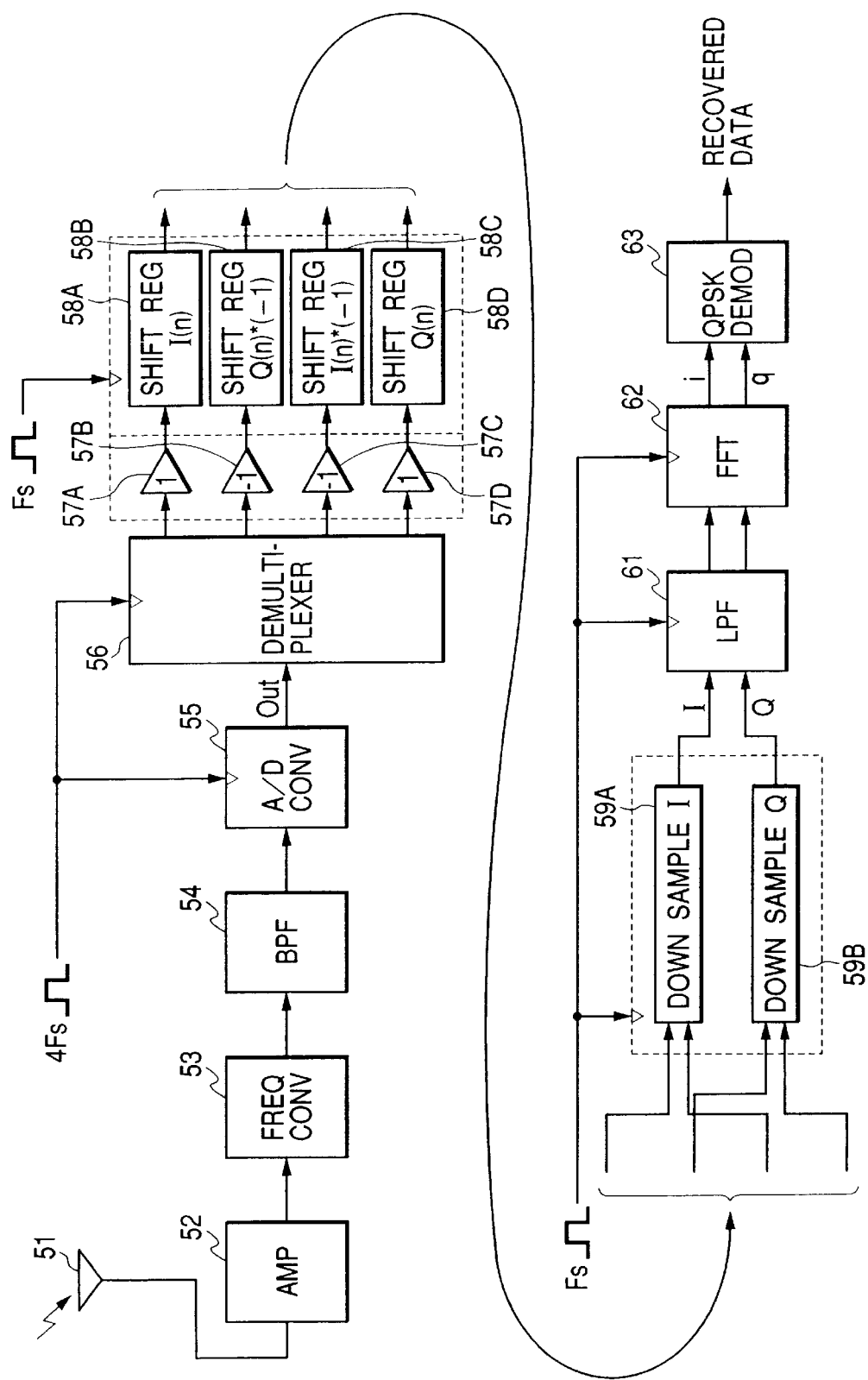
FIG. 3 is a block diagram of a prior-art OFDM demodulation apparatus.

FIG. 3 shows a prior-art OFDM demodulation apparatus designed to receive an RF OFDM signal transmitted from the prior-art OFDM modulation apparatus in FIG. 1. The prior-art apparatus of FIG. 3 includes an antenna 51 for catching an RF multiple-carrier signal (an RF OFDM signal). The caught RF multiple-carrier signal is fed from the antenna 51 to a frequency converter 53 via an RF amplifier 52. The frequency converter 53 down-converts the RF multiple-carrier signal into a corresponding multiple-carrier signal in a baseband centered at a low sampling frequency Fs. The baseband multiple-carrier signal is transmitted from the frequency converter 53 to an A/D converter 55 via a band-pass filter (BPF) 54. The band-pass filter 54 removes unwanted frequency components from the baseband multiple-carrier signal. The A/D converter 55 periodically samples the baseband multiple-carrier signal at a high frequency 4Fs, and converts every sample of the baseband multiple-carrier signal into a corresponding digital sample. The high sampling frequency 4Fs is provided by a high-frequency clock pulse signal. The A/D converter 55 outputs a sequence of the resultant digital samples to a demultiplexer 56.

In the prior-art apparatus of FIG. 3, the demultiplexer 56, multipliers 57A, 57B, 57C, and 57D, shift registers 58A, 58B, 58C, and 58D, and down samplers 59A and 59B compose a digital quadrature demodulator for converting the output digital signal of the A/D converter 55 into a pair of quadrature-demodulation-resultant digital I and Q signals.

Specifically, the demultiplexer 56 divides the output digital signal from the A/D converter 55 into four digital signals. The demultiplexer 56 outputs the four division-resultant digital signals to the multipliers 57A, 57B, 57C, and 57D, respectively. The demultiplexer 56 operates at the high sampling frequency 4Fs. During every cycle provided by four clock pulses of the high-frequency clock pulse signal, the demultiplexer 56 distributes first, second, third, and fourth samples of the output digital signal of the A/D converter 55 to the multipliers 57A, 57B, 57C, and 57D, respectively. The device 57A multiplies the first output digital signal from the demultiplexer 56 by "1", and hence generates a digital I signal. The multiplier 57A outputs the multiplication-resultant digital signal (the digital I signal) to the shift register 58A. The shift register 58A temporarily stores and holds the digital signal from the multiplier 57A. Thus, the output digital signal of the multiplier 57A passes through the shift register 58A while being delayed thereby. The device 57B multiplies the second output digital signal from the demultiplexer 56 by "-1", and hence generates a digital -Q signal. The multiplier 57B outputs the multiplication-resultant digital signal (the digital -Q signal) to the shift register 58B. The shift register 58B temporarily stores and holds the digital signal from the multiplier 57B. Thus, the output digital signal of the multiplier 57B passes through the shift register 58B while being delayed thereby. The device 57C multiplies the third output digital signal from the demultiplexer 56 by "−1", and hence generates a digital −I signal. The multiplier 57C outputs the multiplication-resultant digital signal (the digital −I signal) to the shift register 58C. The shift register 58C temporarily stores and holds the digital signal from the multiplier 57C. Thus, the output digital signal of the multiplier 57C passes through the shift register 58C while being delayed thereby. The device 57D multiplies the fourth output digital signal from the demultiplexer 56 by "1", and hence generates a digital Q signal. The multiplier 57D outputs the multiplication-resultant digital signal (the digital Q signal) to the shift register 58D. The shift register 58D temporarily stores and holds the digital signal from the multiplier 57D. Thus, the output digital signal of the multiplier 57D passes through the shift register 58D while being delayed thereby. The shift registers 58A, 58B, 58C, and 58D operate at a low sampling frequency Fs provided by a low-frequency clock pulse signal. The low sampling frequency Fs is equal to one fourth of the high sampling frequency 4Fs. The timings of operation of the shift registers 58A–58D are offset so that they can reliably receive effective samples of the output signals of the multipliers 57A–57D. The down sampler 59A receives the digital I signal and the digital −I signal from the shift registers 58A and 58C respectively. The down sampler 59A averages the digital I signal and the digital −I signal into a mean digital I signal. This action of the down sampler 59A is equivalent to a down sampling process. The down sampler 59A outputs the mean digital I signal. The down sampler 59B receives the digital −Q signal and the digital Q signal from the shift registers 58B and 58D respectively. The down sampler 59B averages the digital −Q signal and the digital Q signal into a mean digital Q signal. This action of the down sampler 59B is equivalent to a down sampling process. The down sampler 59B outputs the mean digital Q signal. The down samplers 59A and 59B operate at the low sampling frequency Fs.

In the prior-art apparatus of FIG. 3, a low pass filter (LPF) 61 receives the mean digital I signal from the down sampler 59A. The low pass filter 61 removes unwanted high-frequency components from the mean digital I signal. Thereby, the low pass filter 61 generates and outputs the filtering-resultant digital I signal. In addition, the low pass filter 61 receives the mean digital Q signal from the down sampler 59B. The low pass filter 61 removes unwanted high-frequency components from the mean digital Q signal. Thereby, the low pass filter 61 generates and outputs the filtering-resultant digital Q signal. The low pass filter 61 operates at the low sampling frequency Fs. An FFT section 62 receives the filtering-resultant digital I and Q signals from the low pass filter 61. The FFT section 62 subjects the filtering-resultant digital I and Q signals to FFT (fast Fourier transform), thereby converting the filtering-resultant digital I and Q signals into FFT-resultant real-part digital signals and FFT-resultant imaginary-part digital signals corresponding to orthogonal baseband carrier frequencies. The FFT section 62 outputs the FFT-resultant real-part digital signals to a QPSK demodulator 63 as digital I signals. The FFT section 62 outputs the FFT-resultant imaginary-part digital signals to the QPSK demodulator 63 as digital Q signals. The FFT section 62 operates at the low sampling frequency Fs. The QPSK demodulator 63 subjects the digital I and Q signals to processing which corresponds to QPSK demodulation, thereby recovering original digital data from the digital I and Q signals. The QPSK demodulator 63 outputs the recovered original data.

In the prior-art apparatus of FIG. 3, the A/D converter 55 and the demultiplexer 56 operate at the high sampling frequency 4Fs equal to four times the low sampling frequency Fs at which the FFT section 62 operates. Therefore, the A/D converter 55 and the demultiplexer 56 are required to accurately operate even at a high sampling frequency. Thus, the A/D converter 55 and the demultiplexer 56 are expensive.

First Embodiment

Figure 4:
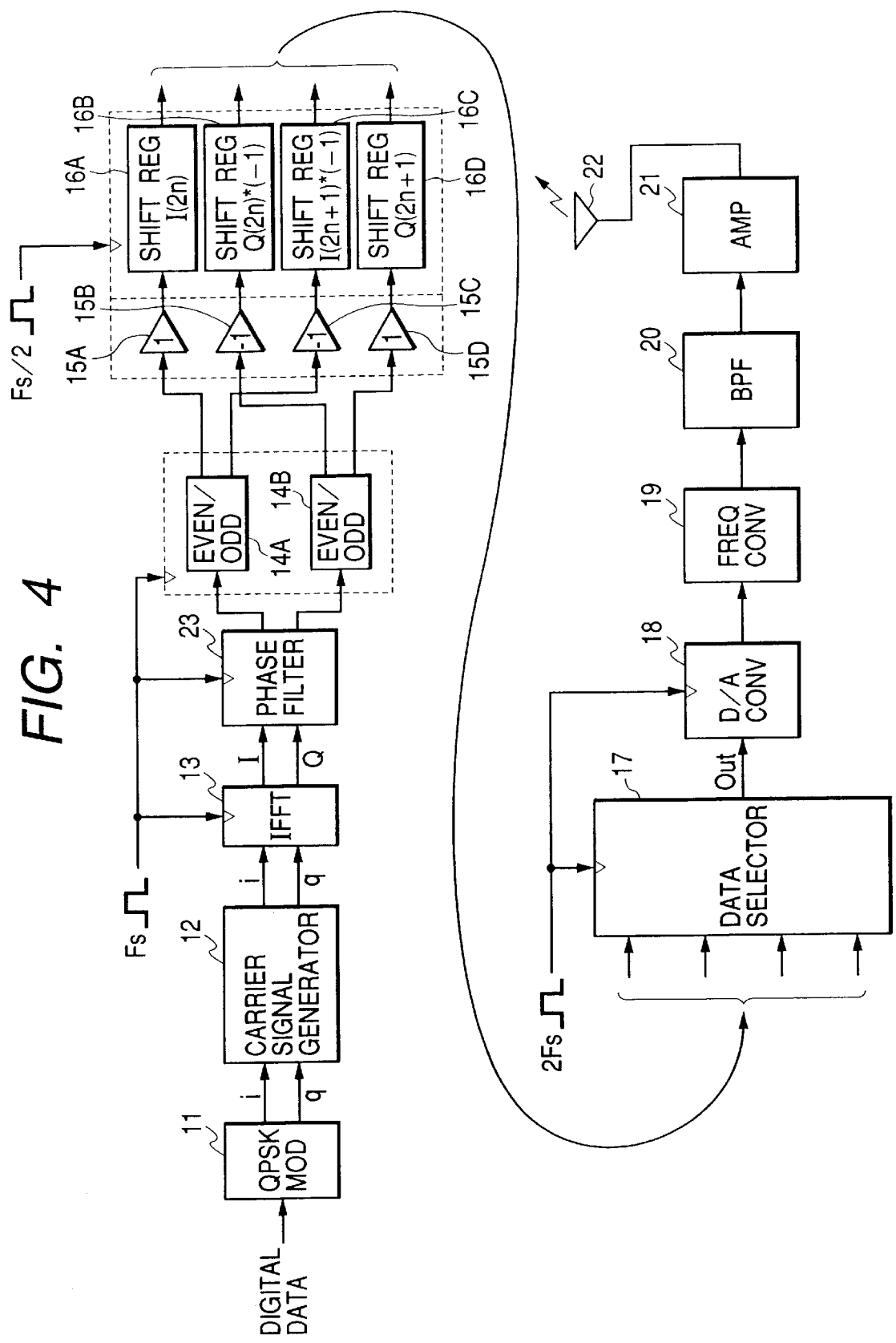
FIG. 4 is a block diagram of an OFDM modulation apparatus according to a first embodiment of this invention.

FIG. 4 shows an OFDM (orthogonal frequency division multiplexing) modulation apparatus according to a first embodiment of this invention. The apparatus of FIG. 4 includes a QPSK modulator 11 receiving original digital data to be transmitted. The QPSK modulator 11 subjects the original digital data to processing which corresponds to QPSK modulation. It should be noted that the QPSK modulation may be replaced by QAM (quadrature amplitude modulation) or digital modulation of another type. The QPSK modulator 11 converts the original digital data into digital I (in-phase) signals and digital Q (quadrature) signals. The QPSK modulator 11 outputs the digital I and Q signals. The QPSK modulator 11 responds to an intermediate-frequency clock pulse signal providing a predetermined intermediate sampling frequency Fs. Thus, the digital I and Q signals generated by the QPSK modulator 11 have a period corresponding to the predetermined intermediate sampling frequency Fs. The intermediate-frequency clock pulse signal is generated by a clock pulse signal generator (not shown).

A carrier signal generator 12 follows the QPSK modulator 11, and receives the digital I signals and the digital Q signals therefrom. The carrier signal generator 12 arranges the digital I signals and the digital Q signals in a frequency domain. Specifically, the carrier signal generator 12 assigns the digital I signals and the digital Q signals to respective frequencies (respective orthogonal baseband carrier frequencies) for IFFT. The carrier signal generator 12 outputs the arrangement-resultant digital I signals and the arrangement-resultant digital Q signals.

An IFFT section 13 follows the carrier signal generator 12, and receives the arrangement-resultant digital I signals and the arrangement-resultant digital Q signals therefrom. The IFFT section 13 responds to the intermediate-frequency clock pulse signal which provides the predetermined intermediate sampling frequency Fs. The IFFT section 13 implements IFFT (inverse fast Fourier transform) at the predetermined intermediate sampling frequency Fs while setting the arrangement-resultant digital I signals as real-part terms and setting the arrangement-resultant digital Q signals as imaginary-part terms. The IFFT section 13 converts and combines the arrangement-resultant digital I signals into an IFFT-resultant digital I signal. In addition, the IFFT section 13 converts and combines the arrangement-resultant digital Q signals into an IFFT-resultant digital Q signal. Specifically, the IFFT section 13 superimposes the arrangement-resultant digital I signals on real-part orthogonal baseband carriers respectively, and combines the resultant real-part orthogonal baseband carriers into the IFFT-resultant digital I signal. In addition, the IFFT section 13 superimposes the arrangement-resultant digital Q signals on imaginary-part orthogonal baseband carriers respectively, and combines the resultant imaginary-part orthogonal baseband carriers into the IFFT-resultant digital Q signal. Since the IFFT section 13 operates at the predetermined intermediate sampling frequency Fs, each of the IFFT-resultant digital I and Q signals has a sequence of samples temporally spaced apart by a period corresponding to the predetermined intermediate sampling frequency Fs. The IFFT section 13 outputs the IFFT-resultant digital I and Q signals.

A phase filter 23 follows the IFFT section 13, and receives IFFT-resultant digital I and Q signals therefrom. The phase filter 23 responds to the intermediate-frequency clock pulse signal which provides the predetermined intermediate sampling frequency Fs. The phase filter 23 processes the IFFT-resultant digital I and Q signals. Specifically, the phase filter 23 shifts the phases of the IFFT-resultant digital I and Q signals to generate phase-shifted digital I and Q signals. The phase of the phase-shifted digital Q signal differs from that of the phase-shifted digital Q signal by 90°. The phase filter 23 may shift only the phase of the IFFT-resultant digital Q signal relative to the IFFT-resultant digital I signal by 90°. In this way, the phase filter 23 provides a 90°-phase difference between the digital I signal and the digital Q signal. Thus, in an assumed sequence of samples of the combination of the resultant digital I and Q signals, samples of the digital I signal occupy even-numbered sample places in the sample sequence while samples of the digital Q signal occupy odd-numbered sample places in the sample sequence. The phase filter 23 outputs the resultant digital I and Q signals.

Demultiplexers 14A and 14B follow the phase filter 23. Multipliers 15A and 15C follow the demultiplexer 14A. Multipliers 15B and 15D follow the demultiplexer 14B.

The demultiplexer 14A receives the digital I signal from the phase filter 23. The demultiplexer 14A responds to the intermediate-frequency clock pulse signal which provides the predetermined intermediate sampling frequency Fs. The demultiplexer 14A rearranges samples of the received digital I signal into a sequence of even-numbered samples and a sequence of odd-numbered samples. The demultiplexer 14A outputs the sequence of even-numbered samples, that is, the even-sample digital I signal, to the multiplier 15A. The demultiplexer 14A outputs the sequence of odd-numbered samples, that is, the odd-sample digital I signal, to the multiplier 15C.

The demultiplexer 14B receives the digital Q signal from the phase filter 23. The demultiplexer 14B responds to the intermediate-frequency clock pulse signal which provides the predetermined intermediate sampling frequency Fs. The demultiplexer 14B rearranges samples of the received digital Q signal into a sequence of even-numbered samples and a sequence of odd-numbered samples. The demultiplexer 14B outputs the sequence of even-numbered samples, that is, the even-sample digital Q signal, to the multiplier 15B. The demultiplexer 14B outputs the sequence of odd-numbered samples, that is, the odd-sample digital Q signal, to the multiplier 15D.

The multiplier 15A multiplies the even-sample digital I signal by "1". The multiplier 15B multiplies the even-sample digital Q signal by "−1". The multiplier 15C multiplies the odd-sample digital I signal by "−1". The multiplier 15D multiplies the odd-sample digital Q signal by "1".

A shift register 16A follows the multiplier 15A, and receives the multiplication-resultant digital signal therefrom. The shift register 16A temporarily stores and holds the digital signal from the multiplier 15A. Thus, the output digital signal of the multiplier 15A passes through the shift register 16A while being delayed thereby. The shift register 16A responds to a low-frequency clock pulse signal providing a predetermined low sampling frequency Fs/2 equal to a half of the predetermined intermediate sampling frequency Fs. Thus, the state of the output digital signal from the shift register 16A periodically changes at the predetermined low sampling frequency Fs/2. The low-frequency clock pulse signal is generated by a clock pulse signal generator (not shown).

A shift register 16B follows the multiplier 15B, and receives the multiplication-resultant digital signal therefrom. The shift register 16B temporarily stores and holds the digital signal from the multiplier 15B. Thus, the output digital signal of the multiplier 15B passes through the shift register 16B while being delayed thereby. The shift register 16B responds to the low-frequency clock pulse signal which provides the predetermined low sampling frequency Fs/2. Thus, the state of the output digital signal from the shift register 16B periodically changes at the predetermined low sampling frequency Fs/2.

A shift register 16C follows the multiplier 15C, and receives the multiplication-resultant digital signal therefrom. The shift register 16C temporarily stores and holds the digital signal from the multiplier 15C. Thus, the output digital signal of the multiplier 15C passes through the shift register 16C while being delayed thereby. The shift register 16C responds to the low-frequency clock pulse signal which provides the predetermined low sampling frequency Fs/2. Thus, the state of the output digital signal from the shift register 16C periodically changes at the predetermined low sampling frequency Fs/2.

A shift register 16D follows the multiplier 15D, and receives the multiplication-resultant digital signal therefrom. The shift register 16D temporarily stores and holds the digital signal from the multiplier 15D. Thus, the output digital signal of the multiplier 15D passes through the shift register 16D while being delayed thereby. The shift register 16D responds to the low-frequency clock pulse signal which provides the predetermined low sampling frequency Fs/2. Thus, the state of the output digital signal from the shift register 16D periodically changes at the predetermined low sampling frequency Fs/2.

A data selector 17 follows the shift registers 16A, 16B, 16C, and 16D. The data selector 17 sequentially and cyclically selects one from among the output digital signals of the shift registers 16A, 16B, 16C, and 16D. The selection order in every cycle is as follows: "I-even" (the output digital signal of the shift register 16A), "−Q-even" (the output digital signal of the shift register 16B), "−I-odd" (the output digital signal of the shift register 16C), and "Q-odd" (the output digital signal of the shift register 16D). The data selector 37 outputs the selection-resultant digital signal. The data selector 37 responds to a high-frequency clock pulse signal providing a predetermined high sampling frequency 2Fs equal to twice the predetermined intermediate sampling frequency Fs. The high-frequency clock pulse signal is generated by a clock pulse signal generator (not shown).

A D/A converter 18 follows the data selector 17, and receives the output digital signal therefrom. The D/A converter 18 changes the output digital signal of the data selector 17 into a corresponding analog baseband multiple-carrier signal. The D/A converter 37 outputs the analog baseband multiple-carrier signal. The D/A converter 37 responds to the high-frequency clock pulse signal which provides the predetermined high sampling frequency 2Fs.

A frequency converter 19 follows the D/A converter 18, and receives the analog baseband multiple-carrier signal therefrom. The frequency converter 19 changes the analog baseband multiple-carrier signal into a corresponding RF multiple-carrier signal (a corresponding RF OFDM signal)

in a desired frequency band. The frequency converter 19 outputs the RF multiple-carrier signal. The frequency converter 19 is successively followed by a band-pass filter (BPF) 20, an RF power amplifier 21, and an antenna 22. The band-pass filter 20 receives the RF multiple-carrier signal from the D/A converter 18. The band-pass filter 20 is tuned to the desired frequency band, thereby passing only components of the RF multiple-carrier signal in the desired frequency band and rejecting components thereof outside the desired frequency band. The band-pass filter 20 outputs the filtering-resultant RF multiple-carrier signal to the amplifier 21. The device 21 amplifies the filtering-resultant RF multiple-carrier signal. The amplifier 21 feeds the amplification-resultant RF multiple-carrier signal to the antenna 22. The amplification-resultant RF multiple-carrier signal (the amplification-resultant RF OFDM signal) is radiated by the antenna 22.

Figure 5:
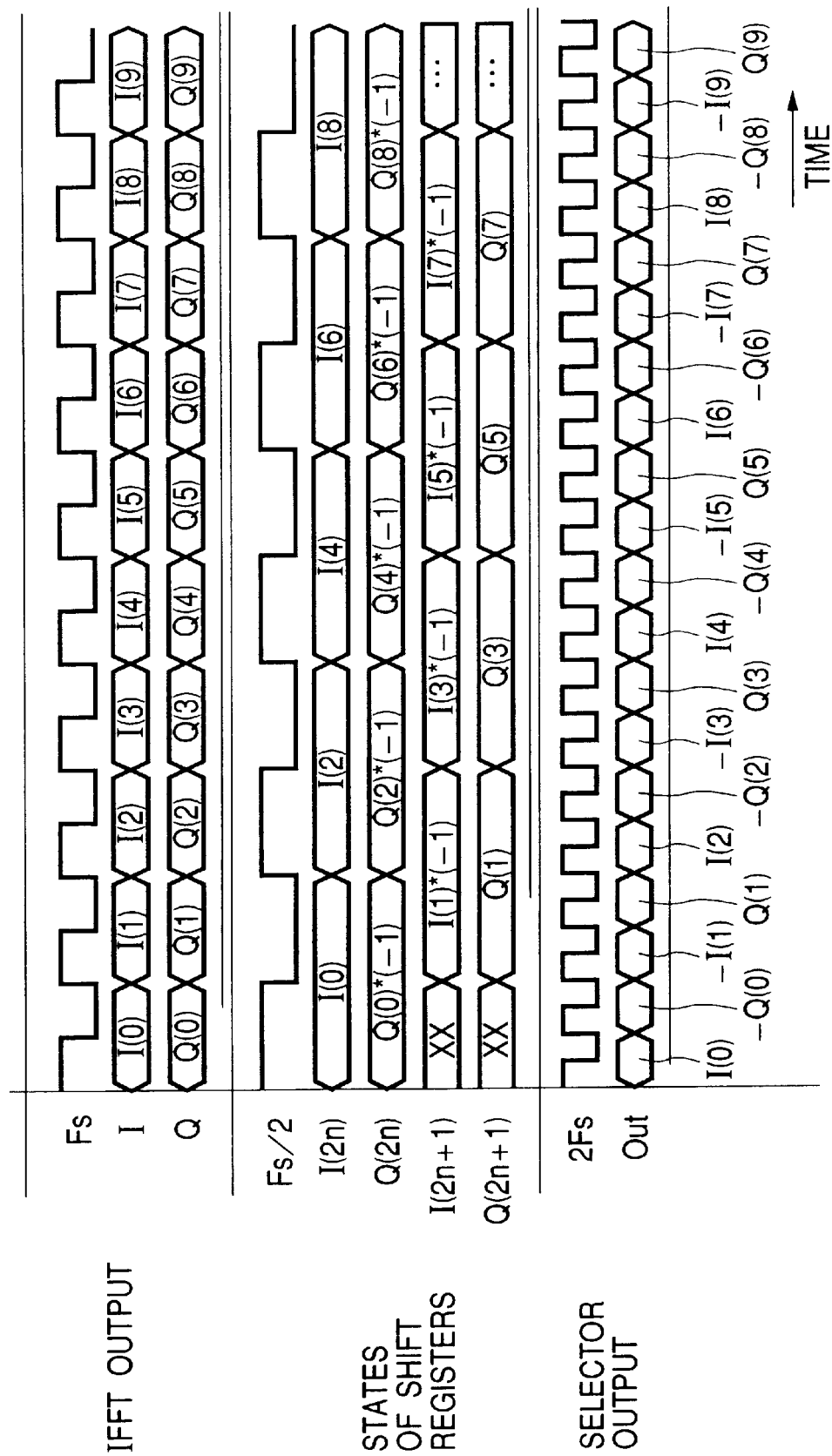
FIG. 5 is a time-domain diagram of signals in the apparatus of FIG. 4.

With reference to FIGS. 4 and 5, the IFFT section 13 operates at the predetermined intermediate sampling frequency Fs provided by the intermediate-frequency clock pulse signal. Accordingly, the states of the IFFT-resultant digital I and Q signals repetitively change at a period corresponding to the predetermined intermediate sampling frequency Fs. The shift registers 16A, 16B, 16C, and 16D operate at the predetermined low sampling frequency Fs/2 provided by the low-frequency clock pulse signal. Therefore, the states of the output digital signals from the shift registers 16A, 16B, 16C, and 16D repetitively change at a period corresponding to the predetermined low sampling frequency Fs/2. Since the predetermined low sampling frequency Fs/2 is equal to a half of the predetermined intermediate sampling frequency Fs, the state of each of the output digital signals from the shift registers 16A, 16B, 16C, and 16D is held unchanged during every period corresponding to two clock pulses of the intermediate-frequency clock pulse signal providing the predetermined intermediate sampling frequency Fs. The data selector 17 operates at the predetermined high sampling frequency 2Fs provided by the high-frequency clock pulse signal. The predetermined high sampling frequency 2Fs is equal to twice the predetermined intermediate sampling frequency Fs. For every cycle equal to twice the period corresponding to the predetermined intermediate sampling frequency Fs, the data selector 17 sequentially selects the output digital signal from the shift register 16A, the output digital signal from the shift register 16B, the output digital signal from the shift register 16C, and the output digital signal from the shift register 16D in that order (the order as "I→−Q→−I→Q"). The D/A converter 18 also operates at the predetermined high sampling frequency 2Fs.

In the case where discrete data with 1024 points are transmitted according to OFDM at a symbol rate of 20 µs, the predetermined intermediate sampling frequency Fs for the IFFT section 13 is given as follows.

$$Fs=1/\{(20 \cdot 10^{-6})/1024\}=51.2 \text{ (MHz)}$$

In this case, the predetermined high sampling frequency 2Fs for the data selector 17 and the D/A converter 18 is equal to 102.4 MHz. Thus, the operating frequency of the data selector 17 and the D/A converter 18 is lower than that of the data selector 37 and the D/A converter 38 in the prior-art apparatus of FIG. 1. Therefore, the data selector 17 and the D/A converter 18 can be inexpensive.

The phase shifter 23, the demultiplexers 14A and 14B, the multipliers 15A–15D, the shift registers 16A–16D, and the data selector 17 cooperate to implement digital quadrature modulation which combines the IFFT-resultant digital I and Q signals into a single quadrature-modulation-resultant digital signal (the output digital signal from the data selector 17). The digital quadrature modulation virtually uses a digital sine wave and a digital cosine wave having a frequency equal to the predetermined low sampling frequency Fs/2. The digital sine wave periodically changes as "0"→"1"→"0"→"−1". The digital cosine wave periodically changes as "1"→"0"→"1"→"0". The digital sine wave and the digital cosine wave result from periodically sampling an analog sine wave and an analog cosine wave at a frequency (the predetermined high sampling frequency 2Fs) equal to twice the predetermined intermediate sampling frequency Fs for the IFFT section 13. The multiplications by the multipliers 15A–15D correspond to the multiplications among the phase-shifted digital I and Q signals, the digital sine wave, and the digital cosine wave for the digital quadrature modulation. For every cycle equal to twice the period corresponding to the predetermined intermediate sampling frequency Fs, the data selector 17 sequentially selects the output digital signals from the shift registers 16A–16D in response to the high-frequency clock pulse signal providing the predetermined high sampling frequency 2Fs.

It should be noted that the OFDM signal generated by the OFDM modulation apparatus in FIG. 4 can be demodulated by a prior-art OFDM demodulation apparatus or an OFDM demodulation apparatus in one of embodiments of this invention which will be mentioned later.

Second Embodiment

An OFDM (orthogonal frequency division multiplexing) transmission apparatus including an OFDM modulation apparatus generates a group of orthogonal carriers in a band whose center frequency Fc is equal to 0 Hz. An IFFT (inverse fast Fourier transform) section implements the modulation of the orthogonal carriers with data to be transmitted, and the transmitted data are expressed as discrete data having a sampling frequency Fs. The carrier signals with frequencies between 0 to −Fs/2 are equal to signals which appear in the frequency range of Fs/2 to Fs. Therefore, the discrete data are in the frequency range of 0 to Fs.

In the OFDM transmission apparatus, the data-added carriers compose a multiple-carrier signal. The multiple-carrier signal is subjected to digital quadrature modulation. Specifically, the I (in-phase) component of the multiple-carrier signal is multiplied by a digital cosine wave "cos (2πFs)" while the Q (quadrature) component thereof is multiplied by a digital sine wave "sin(2πFs)". The digital cosine wave "cos(2πFs)" and the digital sine wave "sin (2πFs)" have a frequency equal to the sampling frequency Fs. Each of the digital cosine wave "cos(2πFs)" and the digital sine wave "sin(2πFs)" has a sequence of samples appearing at a frequency 4Fs equal to four times the sampling frequency Fs. The subtraction is executed between the two multiplication results. Thus, the digital quadrature modulation is expressed by the following trigonometric equation.

$$\cos(2\pi F) \cdot \cos(2\pi Fs) - \sin(2\pi F) \cdot \sin(2\pi Fs) = \cos\{2\pi(F+Fs)\} \quad (1)$$

Figure 7:
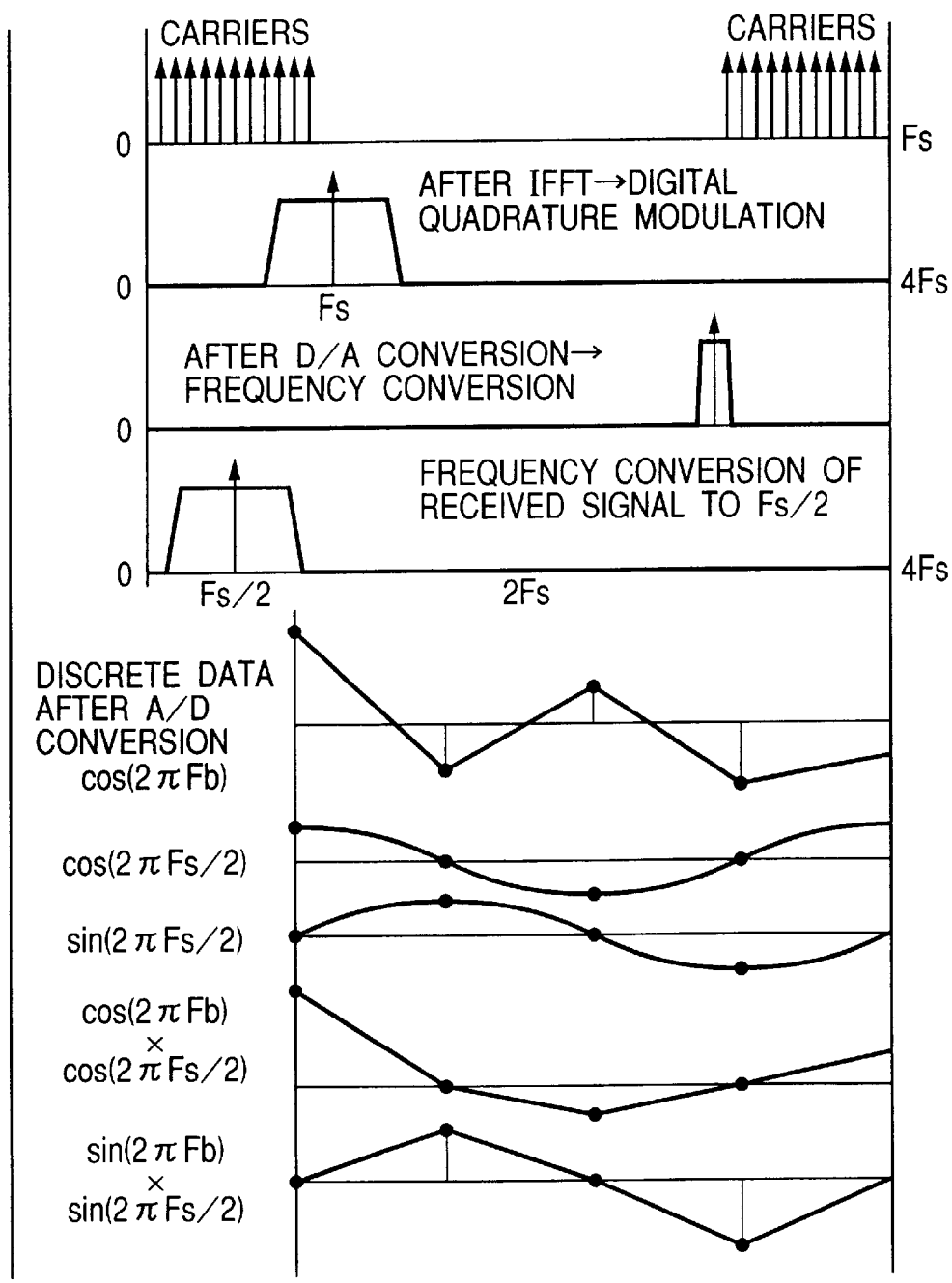
FIG. 7 is a diagram of signals in the apparatus of FIG. 6.

As understood from the equation (1), the digital quadrature modulation converts the multiple-carrier signal into a signal having a sampling frequency 4Fs equal to four times the sampling frequency Fs, and having a center frequency equal to the sampling frequency Fs (see FIG. 7).

The digital cosine wave sequentially changes as "1"→"0"→"−1"→"0" at a period corresponding to the sampling frequency 4Fs. The digital sine wave sequentially changes as "0"→"1"→"0"→"−1" at a period corresponding to the sampling frequency 4Fs. Samples of the multiplication results are regularly arranged as follows.

I(0), −Q(0), −I(0), Q(0), I(1), −Q(1), −I(1), Q(1), . . . , I(n), −Q(n), −I(n), Q(n)

The arrangement-resultant sample sequence is a signal caused by the digital quadrature modulation.

In the OFDM transmission apparatus, the signal resulting from the digital quadrature modulation is converted into an analog signal by a D/A converter. The analog signal is frequency-converted into an RF signal by a frequency converter. The RF signal is passed through a band-pass filter (BPF) to limit the frequency band of the RF signal. The band-limited RF signal is transmitted from the OFDM transmission apparatus as an RF OFDM signal.

An OFDM (orthogonal frequency division multiplexing) demodulation apparatus of a second embodiment of this invention is designed to receive an RF OFDM signal from the OFDM transmission apparatus. In the OFDM demodulation apparatus, a frequency converter changes the received RF OFDM signal into a low-frequency OFDM signal whose center frequency is equal to a half of the transmission sampling frequency Fs (see FIG. 7). This action of the frequency converter is expressed by the following trigonometric equation.

$$\cos(2\pi F)\cdot\cos\{2\pi(F-Fs/2)\}=(\tfrac{1}{2})\cdot[\cos\{2\pi(2F-Fs/2)\}+\cos\{2\pi(Fs/2)\}] \quad (2)$$

In the OFDM demodulation apparatus, a band-pass filter (BPF) extracts frequency components of the low-frequency OFDM signal which correspond to the second term in the right side of the equation (2). An A/D converter changes the output signal of the band-pass filter into a digital discrete signal "cosα" with a high sampling frequency 2Fs twice the transmission sampling frequency Fs, and with a discrete point number of 2N. The center frequency Fc of the digital discrete signal "cosα" is equal to Fs/2, that is, a half of the transmission sampling frequency Fs.

The OFDM demodulation apparatus subjects the digital discrete signal "cosα" to digital quadrature demodulation expressed by the following trigonometric equations.

$$\cos\alpha\cdot\cos\beta=(\tfrac{1}{2})\cdot\{\cos(\alpha+\beta)+\cos(\alpha-\beta)\}$$

$$\cos\alpha\cdot\sin\beta=-(\tfrac{1}{2})\cdot\{\sin(\alpha+\beta)-\sin(\alpha-\beta)\} \quad (3)$$

In order to generate a pair of an I (in-phase) signal and a Q (quadrature) signal having a center frequency of 0 as a result of the quadrature demodulation, a signal of interest is multiplied by a cosine wave and a sine wave with a frequency Fs/2, and high-frequency components are removed from the multiplication-resultant signals. Specifically, the following trigonometric multiplications are executed.

$$2\cos(2\pi F)\cdot\cos(2\pi Fs/2)=\cos\{2\pi(F+Fs/2)\}+\cos\{2\pi(F-Fs/2)\}$$

$$2\cos(2\pi F)\cdot\sin(2\pi Fs/2)=-\sin\{2\pi(F+Fs/2)\}+\sin\{2\pi(F-Fs/2)\} \quad (4)$$

Then, a low pass filter (LPF) removes high-frequency components from the multiplication-resultant signals which correspond to the first terms in the right-hand sides of the equations (4). Each of the cosine wave and the sine wave is represented by four samples per period. Accordingly, the cosine wave and the sine wave have a sampling frequency 2Fs equal to twice the transmission sampling frequency Fs. The sampling frequency of the cosine wave and the sine wave is equal to the sampling frequency of the digital discrete signal "cosα" outputted from the A/D converter. The cosine wave sequentially changes as "1"→"0"→"−1"→"0" for every cycle. The sine wave sequentially changes as "0"→"1"→"0"→"−1" for every cycle. When one of the cosine wave and the sine wave is "1" or "−1", the other is "0".

Thus, in the OFDM demodulation apparatus, the output signal of the A/D converter is amplified at a gain of "2", and the amplification-resultant signal is divided into a sequence of even-numbered samples and a sequence of odd-numbered samples before the multiplications are executed according to the equations (4). Consequently, a pair of an I signal and a Q signal each having a discrete point number of N are generated as output signals from the low pass filter. The I signal originates from even-numbered samples of the amplification-resultant signal while the Q signal originates from odd-numbered samples thereof. Therefore, the Q signal has a phase difference (a phase error) of 90° from the I signal. The OFDM demodulation apparatus includes a phase filter for equalizing the phases of the I and Q signals outputted from the low pass filter. In the OFDM demodulation apparatus, an FFT (fast Fourier transform) section subjects the output signals from the phase filter to FFT, and thereby converts the phase-filter output signals into transmitted data. In this way, the transmitted data are recovered.

Figure 6:
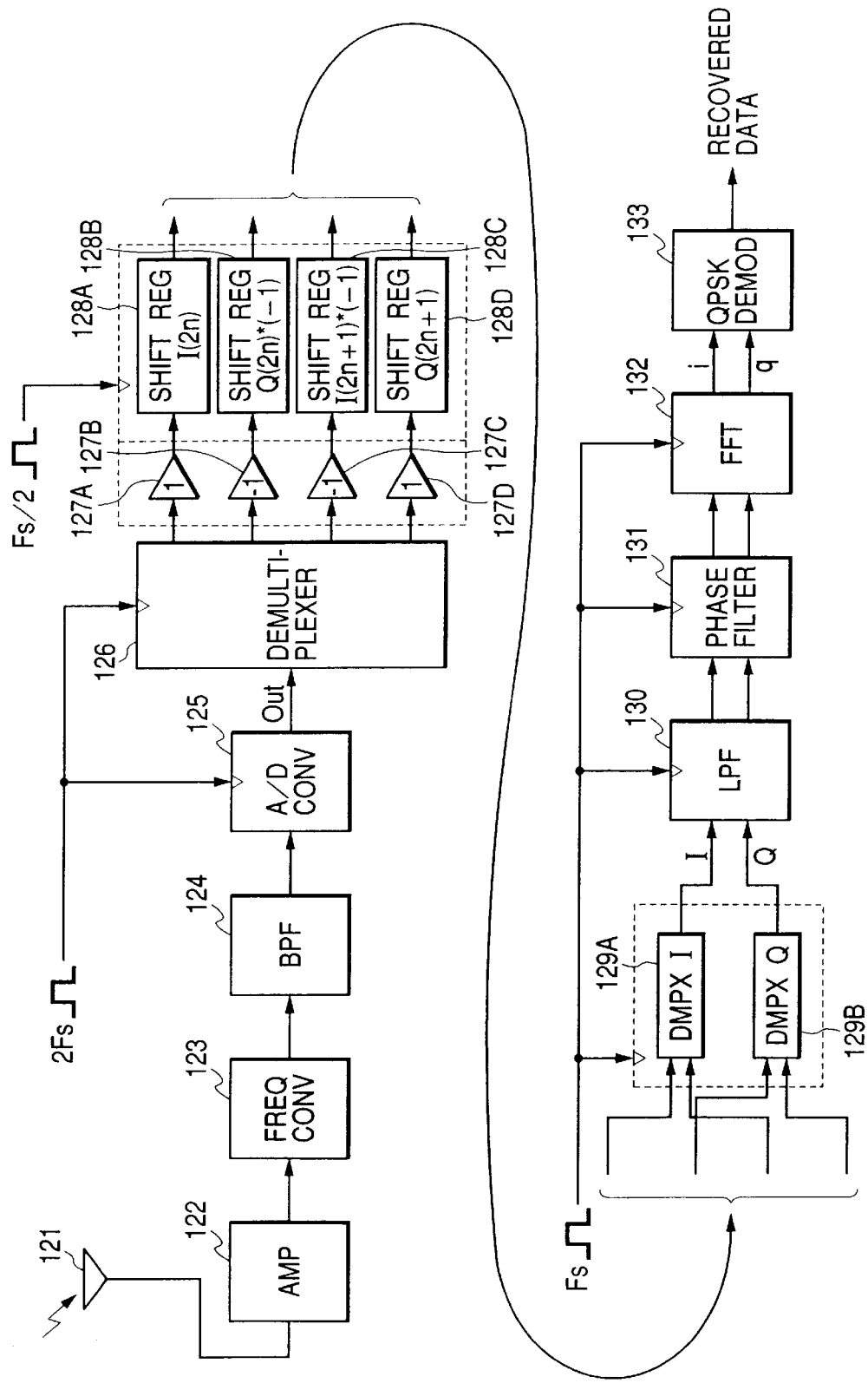
FIG. 6 is a block diagram of an OFDM demodulation apparatus according to a second embodiment of this invention.

FIG. 6 shows the details of the OFDM demodulation apparatus according to the second embodiment of this invention. The OFDM demodulation apparatus in FIG. 6 is designed to receive an RF OFDM signal transmitted from the previously-mentioned OFDM transmission apparatus, the OFDM modulation apparatus in FIG. 1, the OFDM modulation apparatus in FIG. 4, or another OFDM modulation apparatus. The apparatus of FIG. 6 includes an antenna 121 which is successively followed by an RF amplifier 122, a frequency converter 123, a band-pass filter (BPF) 124, an A/D converter 125, and a demultiplexer 126.

The antenna 121 acts to catch an RF multiple-carrier signal (an RF OFDM signal). The caught RF multiple-carrier signal is fed from the antenna 121 to the RF amplifier 122. The device 122 amplifies the RF multiple-carrier signal. The amplifier 122 outputs the amplification-resultant RF multiple-carrier signal to the frequency converter 123. The frequency converter 123 down-converts the RF multiple-carrier signal into a corresponding multiple-carrier signal in a low frequency band (a baseband) centered at a predetermined low sampling frequency Fs/2 (see FIG. 7). The frequency converter 123 outputs the baseband multiple-carrier signal to the band-pass filter 124. The band-pass filter 124 removes unwanted frequency components from the baseband multiple-carrier signal. The band-pass filter 124 outputs the filtering-resultant baseband multiple-carrier signal to the A/D converter 125. The A/D converter 125 periodically samples the baseband multiple-carrier signal at a predetermined high frequency 2Fs, and converts every sample of the baseband multiple-carrier signal into a corresponding digital sample. The predetermined high sampling frequency 2Fs is provided by a high-frequency clock pulse signal. The high-frequency clock pulse signal is generated by a clock pulse signal generator (not shown). The A/D converter 125 responds to the high-frequency clock pulse signal, and hence operates at the predetermined high sampling frequency 2Fs. The A/D converter 125 outputs a sequence of the resultant digital samples to the demultiplexer 126.

The demultiplexer 126 is successively followed by a set of multipliers 127A, 127B, 127C, and 127D, a set of shift registers 128A, 128B, 128C, and 128D, and a set of multiplexers 129A and 129B. The demultiplexer 126, the multipliers 127A–127D, the shift registers 128A–128D, and the multiplexers 129A and 129B compose a digital quadrature demodulator for converting the output digital signal of the A/D converter 125 into a pair of quadrature-demodulation-resultant digital I and Q signals.

The demultiplexer 126 divides the output digital signal from the A/D converter 125 into four digital signals. The demultiplexer 126 outputs the four division-resultant digital signals to the multipliers 127A, 127B, 127C, and 127D, respectively. The demultiplexer 126 responds to the high-frequency clock pulse signal, and hence operates at the predetermined high sampling frequency 2Fs. During every cycle provided by four clock pulses of the high-frequency clock pulse signal, the demultiplexer 126 distributes first, second, third, and fourth samples of the output digital signal of the A/D converter 125 to the multipliers 127A, 127B, 127C, and 127D, respectively. The device 127A multiplies the first output digital signal from the demultiplexer 126 by "1", and hence generates a digital I signal. The multiplier 127A outputs the multiplication-resultant digital signal (the digital I signal) to the shift register 128A. The shift register 128A temporarily stores and holds the digital signal from the multiplier 127A. Thus, the output digital signal of the multiplier 127A passes through the shift register 128A while being delayed thereby. The device 127B multiplies the second output digital signal from the demultiplexer 126 by "−1", and hence generates a digital −Q signal. The multiplier 127B outputs the multiplication-resultant digital signal (the digital −Q signal) to the shift register 128B. The shift register 128B temporarily stores and holds the digital signal from the multiplier 127B. Thus, the output digital signal of the multiplier 127B passes through the shift register 128B while being delayed thereby. The device 127C multiplies the third output digital signal from the demultiplexer 126 by "−1", and hence generates a digital −I signal. The multiplier 127C outputs the multiplication-resultant digital signal (the digital −I signal) to the shift register 128C. The shift register 128C temporarily stores and holds the digital signal from the multiplier 127C. Thus, the output digital signal of the multiplier 127C passes through the shift register 128C while being delayed thereby. The device 127D multiplies the fourth output digital signal from the demultiplexer 126 by "1", and hence generates a digital Q signal. The multiplier 127D outputs the multiplication-resultant digital signal (the digital Q signal) to a shift register 128D. The shift register 128D temporarily stores and holds the digital signal from the multiplier 127D. Thus, the output digital signal of the multiplier 127D passes through the shift register 128D while being delayed thereby. The shift registers 128A, 128B, 128C, and 128D respond to a low-frequency clock pulse signal providing a predetermined low sampling frequency Fs/2 equal to one fourth of the predetermined high sampling frequency 2Fs. Accordingly, the shift registers 128A, 128B, 128C, and 128D operate at the predetermined low sampling frequency Fs/2. The timings of operation of the shift registers 128A–128D are offset so that they can reliably receive effective samples of the output signals of the multipliers 127A–127D. The low-frequency clock pulse signal is generated by a clock pulse signal generator (not shown). The multiplexer 129A receives the digital I signal and the digital −I signal from the shift registers 128A and 128C respectively. The multiplexer 129A alternately selects the digital I signal and the digital −I signal, and thereby combines the digital I signal and the digital −I signal into a multiplexing-resultant digital I signal. The multiplexer 129A outputs the multiplexing-resultant digital I signal. The multiplexer 129B receives the digital −Q signal and the digital Q signal from the shift registers 128B and 128D respectively. The multiplexer 129B alternately selects the digital −Q signal and the digital Q signal, and thereby combines the digital −Q signal and the digital Q signal into a multiplexing-resultant digital Q signal. The multiplexer 129B outputs the multiplexing-resultant digital Q signal. The multiplexers 129A and 129B respond to an intermediate-frequency clock pulse signal providing a predetermined intermediate sampling frequency Fs equal to twice the predetermined low sampling frequency Fs/2. Accordingly, the multiplexers 129A and 129B operate at the predetermined intermediate sampling frequency Fs. The intermediate-frequency clock pulse signal is generated by a clock pulse signal generator (not shown). During every cycle corresponding to two clock pulses of the intermediate-frequency clock pulse signal, the multiplexer 129A selects the digital I signal first, and selects the digital −I signal second. During every cycle corresponding to two clock pulses of the intermediate-frequency clock pulse signal, the multiplexer 129B selects the digital −Q signal first, and selects the digital Q signal second.

The digital quadrature demodulator virtually uses a digital sine wave and a digital cosine wave having a frequency equal to the predetermined low sampling frequency Fs/2. The digital sine wave periodically changes as "0"→"1"→"0"→"−1". The digital cosine wave periodically changes as "1"→"0"→"−1"→"0". The digital sine wave and the digital cosine wave result from periodically sampling an analog sine wave and an analog cosine wave at a frequency (the predetermined high sampling frequency 2Fs) equal to the predetermined high sampling frequency 2Fs. The multiplications by the multipliers 127A–127D correspond to the multiplications among the output digital signal from the A/D converter 125, the digital sine wave, and the digital cosine wave for the digital quadrature demodulation.

A low pass filter (LPF) 130 is connected to the multiplexers 129A and 129B. The low pass filter 130 receives the multiplexing-resultant digital I signal from the multiplexer 129A. The low pass filter 130 removes unwanted high-frequency components from the multiplexing-resultant digital I signal. Thereby, the low pass filter 130 generates and outputs the filtering-resultant digital I signal. In addition, the low pass filter 130 receives the multiplexing-resultant digital Q signal from the multiplexer 129B. The low pass filter 130 removes unwanted high-frequency components from the multiplexing-resultant digital Q signal. Thereby, the low pass filter 130 generates and outputs the filtering-resultant digital Q signal. The low pass filter 130 responds to the intermediate-frequency clock pulse signal, and hence operates at the predetermined intermediate sampling frequency Fs.

A phase filter 131 follows the low pass filter 130, and receives the filtering-resultant digital I and Q signals therefrom. There is a 90°-phase difference between the filtering-resultant digital I signal and the filtering-resultant digital Q signal. The phase filter 131 processes the filtering-resultant digital I and Q signals to remove the 90°-phase difference and to thereby equalize the phases of the filtering-resultant digital I and Q signals. The phase filter 131 outputs the equal-phase digital I and Q signals.

An FFT section 132 follows the phase filter 131, and receives the output digital I and Q signals from the phase filter 131. The FFT section 132 subjects the digital I and Q signals to FFT (fast Fourier transform), thereby converting the digital I and Q signals into FFT-resultant real-part digital signals and FFT-resultant imaginary-part digital signals corresponding to orthogonal baseband carrier frequencies. The FFT section 132 outputs the FFT-resultant real-part digital signals as digital I signals. The FFT section 132 outputs the FFT-resultant imaginary-part digital signals as digital Q signals. The FFT section 132 responds to the intermediate-frequency clock pulse signal, and hence operates at the predetermined intermediate sampling frequency Fs.

A QPSK demodulator 133 follows the FFT section 132, and receives the digital I and Q signals therefrom. The QPSK demodulator 133 subjects the digital I and Q signals to processing which corresponds to QPSK demodulation, thereby recovering original digital data from the digital I and Q signals. The QPSK demodulator 133 outputs the recovered original data. It should be noted that the QPSK demodulator 133 may be replaced by a QAM demodulator or another demodulator.

As previously mentioned, the A/D converter 125 and the demultiplexer 126 operate at the predetermined high sampling frequency 2Fs. The predetermined high sampling frequency 2Fs is equal to a half of the operating frequency 4Fs of the A/D converter 55 and the demultiplexer 56 in FIG. 3. Therefore, the A/D converter 125 and the demultiplexer 126 can be inexpensive.

With reference to FIG. 7, a modulation apparatus uses orthogonal baseband carriers spaced at equal frequency intervals. The modulation apparatus generates a digital baseband OFDM signal by IFFT and digital quadrature modulation. The digital baseband OFDM signal is in a frequency band centered at the predetermined intermediate sampling frequency Fs. The modulation apparatus converts the digital baseband OFDM signal into an RF OFDM signal by D/A conversion and frequency conversion. The modulation apparatus transmits the RF OFDM signal. The demodulation apparatus of FIG. 6 receives the RF OFDM signal. The frequency converter 123 in the demodulation apparatus down-converts the RF OFDM signal into an analog baseband OFDM signal in the frequency band centered at the predetermined low sampling frequency Fs/2. The A/D converter 125 changes the analog baseband OFDM signal into a digital baseband OFDM signal "cos(2πFb)". The demodulation apparatus subjects the digital baseband OFDM signal "cos(2πFb)" to digital quadrature demodulation virtually using a digital sine wave "sin(2πFs/2)" and a digital cosine wave "cos(2πFs/2)". In the digital quadrature demodulation, the digital baseband OFDM signal "cos(2πFb)" is multiplied by the digital sine wave "sin(2πFs/2)". In addition, the digital baseband OFDM signal "cos(2πFb)" is multiplied by the digital cosine wave "cos(2πFs/2)". The results of the multiplications are used in generating a digital I signal and a digital Q signal being quadrature-demodulation-resultant signals.

It should be noted that the OFDM demodulation apparatus in FIG. 6 can demodulate an OFDM signal generated by a prior-art OFDM modulation apparatus or an OFDM modulation apparatus in one of embodiments of this invention.

Third Embodiment

A third embodiment of this invention is directed to an OFDM modulation apparatus including a digital quadrature modulation apparatus. The digital quadrature modulation apparatus has a device for generating N-point multiple-carrier signals having a predetermined sampling frequency Fs and being in a frequency band whose center frequency is equal to 0 Hz, where N denotes a predetermined natural number. The N-point multiple-carrier signals are in sets each having an in-phase component and a quadrature component. The digital quadrature modulation apparatus has a device for subjecting the N-point multiple-carrier signals to inverse fast Fourier transform to generate a discrete in-phase signal I and a discrete quadrature signal Q defined in a time domain. In the digital quadrature modulation apparatus, there is provided a device for selecting samples I(2n) and I(2n+1) of the discrete in-phase signal I and samples Q(2n) and Q(2n+1) of the discrete quadrature signal Q, where n=0, 1, 2, . . . , N/2. The digital quadrature modulation apparatus also has a device for multiplying the selected sample I(2n+1) by "−1" to generate a sample −I(2n+1), and a device for multiplying the selected sample Q(2n) by "−1" to generate a sample −Q(2n). In the digital quadrature modulation apparatus, there is provided a device for rearranging the samples I(2n), −I(2n+1), −Q(2n), and Q(2n+1) in an order as I(2n), −Q(2n), −I(2n+1), and Q(2n+1) to generate a quadrature-modulation-resultant signal having a sampling frequency equal to twice the predetermined sampling frequency Fs and being in a frequency band whose center frequency is equal to a half of the predetermined sampling frequency Fs.

Figure 8:
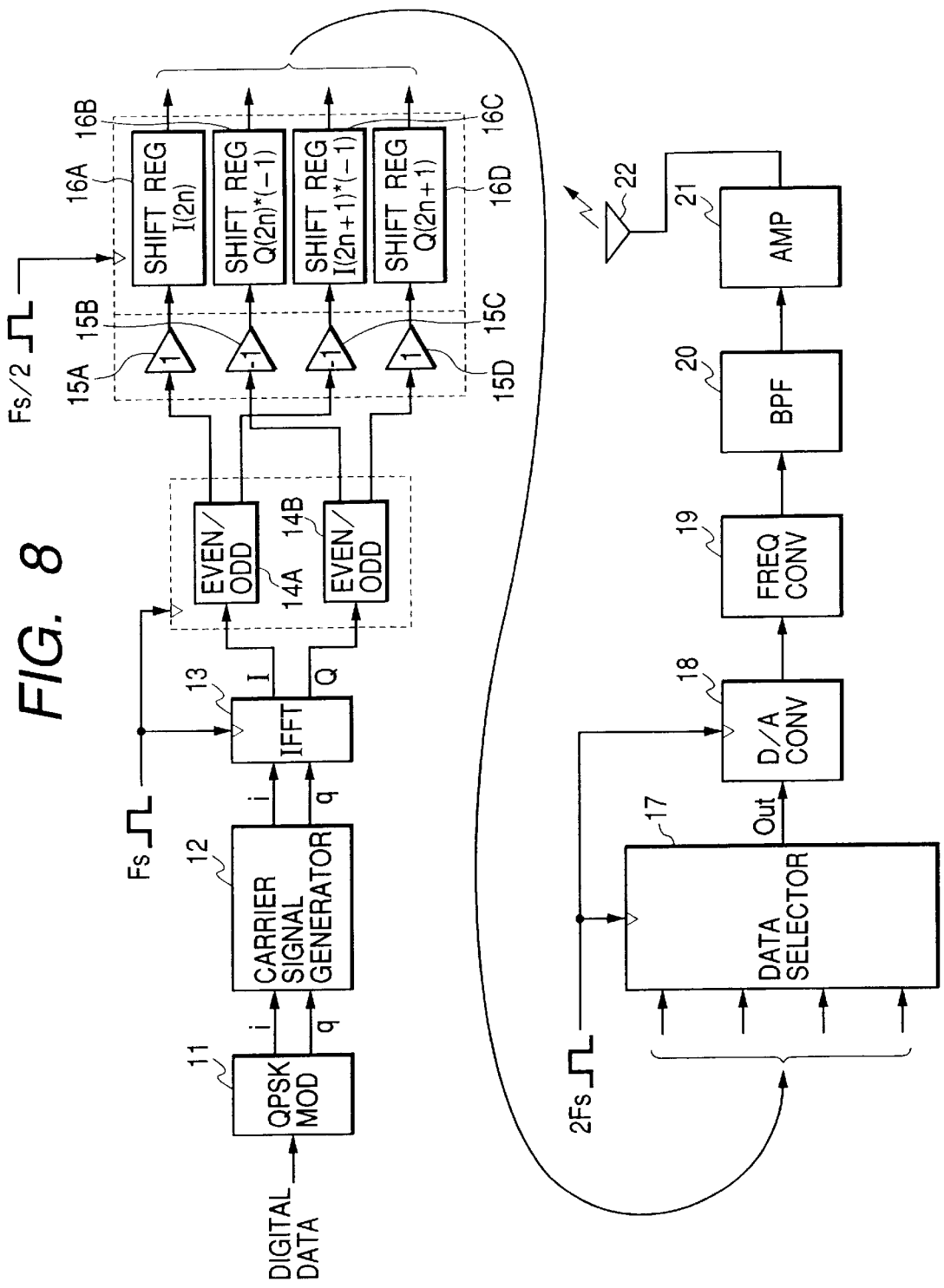
FIG. 8 is a block diagram of an OFDM modulation apparatus according to a third embodiment of this invention.

FIG. 8 shows the OFDM modulation apparatus according to the third embodiment of this invention. The OFDM modulation apparatus of FIG. 8 is similar to the OFDM modulation apparatus of FIG. 4 except that the phase filter 23 (see FIG. 4) is omitted.

In the OFDM modulation apparatus of FIG. 8, demultiplexers 14A and 14B follow an IFFT section 13. The demultiplexer 14A receives an IFFT-resultant digital I signal from the IFFT section 13. The demultiplexer 14A rearranges samples of the IFFT-resultant digital I signal into a sequence of even-numbered samples and a sequence of odd-numbered samples. The demultiplexer 14A outputs the sequence of even-numbered samples, that is, the even-sample digital I signal, to the multiplier 15A. The demultiplexer 14A outputs the sequence of odd-numbered samples, that is, the odd-sample digital I signal, to the multiplier 15C.

On the other hand, the demultiplexer 14B receives an IFFT-resultant digital Q signal from the IFFT section 13. The demultiplexer 14B rearranges samples of the IFFT-resultant digital Q signal into a sequence of even-numbered samples and a sequence of odd-numbered samples. The demultiplexer 14B outputs the sequence of even-numbered samples, that is, the even-sample digital Q signal, to the multiplier 15B. The demultiplexer 14B outputs the sequence of odd-numbered samples, that is, the odd-sample digital Q signal, to the multiplier 15D.

The demultiplexers 14A and 14B, the multipliers 15A–15D, shift registers 16A–16D, and a data selector 17 cooperate to implement digital quadrature modulation which combines the IFFT-resultant digital I and Q signals into a single quadrature-modulation-resultant digital signal (the output digital signal from the data selector 17). The digital quadrature modulation virtually uses a digital sine wave and a digital cosine wave having a frequency equal to the predetermined low sampling frequency Fs/2. The digital sine wave periodically changes as "0"→"1"→"0"→"−1". The digital cosine wave periodically changes as "1"→"0"→"−1"→"0". The digital sine wave and the digital cosine wave result from periodically sampling an analog sine wave and an analog cosine wave at a frequency (the predetermined high sampling frequency 2Fs) equal to twice the predetermined intermediate sampling frequency Fs for the IFFT section 13. The multiplications by the multipliers 15A–15D correspond to the multiplications among the IFFT-resultant digital I and Q signals, the digital sine wave, and the digital cosine wave for the digital quadrature modulation. For every cycle equal to twice the period corresponding to the predetermined intermediate sampling frequency Fs, the data selector 17 sequentially selects the output digital signals from the shift registers 16A–16D in response to the high-frequency clock pulse signal providing the predetermined high sampling frequency 2Fs.

Figure 9:
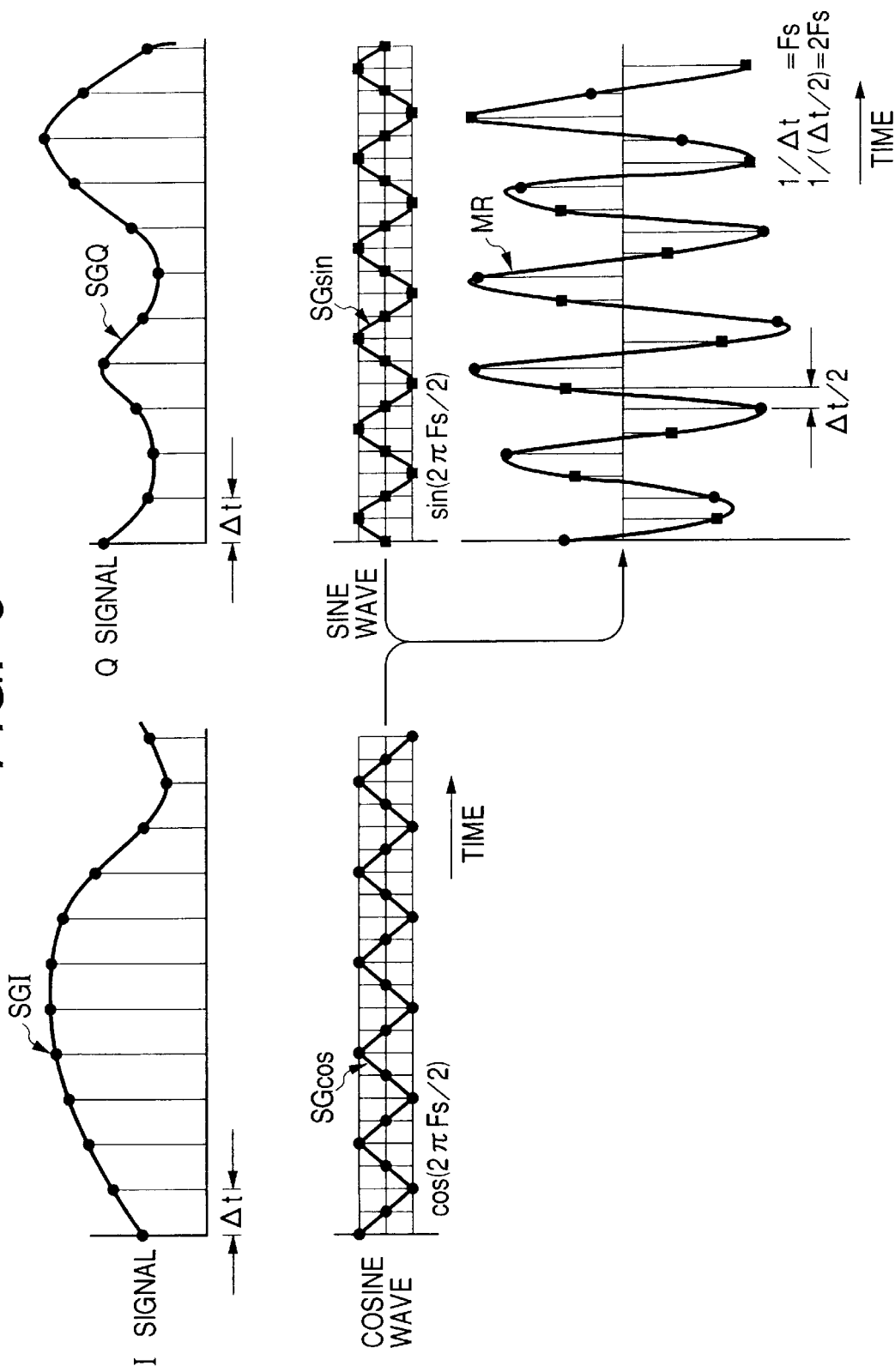
FIG. 9 is a time-domain diagram of waveforms represented by digital signals in the OFDM modulation apparatus of FIG. 8.

In FIG. 9, "SGI" denotes an example of the waveform represented by samples of the IFFT-resultant digital I signal while "SGQ" denotes an example of the waveform represented by samples of the IFFT-resultant digital Q signal. In addition, "SGcos" denotes the digital cosine wave having a frequency equal to the predetermined low sampling frequency Fs/2. Furthermore, "SGsin" denotes the digital sine wave having a frequency equal to the predetermined low sampling frequency Fs/2. As shown in FIG. 9, the digital cosine wave SGcos periodically changes as "1"→"0"→"-1"→"0". The digital sine wave SGsin periodically changes as "0"→"1"→"0"→"-1". The demultiplexer 14A and the multipliers 15A and 15C cooperate to multiply the IFFT-resultant digital I signal SGI by the digital cosine wave SGcos. The multipliers 15A and 15C output signals representative of the results of the multiplication which are transmitted via the shift registers 16A and 16C to the data selector 17. The demultiplexer 14B and the multipliers 15B and 15D cooperate to multiply the IFFT-resultant digital Q signal SGQ by the digital sine wave SGsin. The multipliers 15B and 15D output signals representative of the results of the multiplication which are transmitted via the shift registers 16B and 16D to the data selector 17. The output digital signals from the shift registers 16A–16D are sequentially and cyclically selected by the data selector 17, being thereby combined into a single quadrature-modulation-resultant digital signal. The quadrature-modulation-resultant digital signal has a sequence of samples which represents a waveform such as shown by "MR" in FIG. 9. The quadrature-modulation-resultant digital signal is outputted from the data selector 17.

It should be noted that the OFDM signal generated by the OFDM modulation apparatus in FIG. 8 can be demodulated by a prior-art OFDM demodulation apparatus or an OFDM demodulation apparatus in one of embodiments of this invention.

Fourth Embodiment

A fourth embodiment of this invention is directed to an OFDM demodulation apparatus including a digital quadrature demodulation apparatus. The digital quadrature demodulation apparatus is designed for demodulating a quadrature-modulation-resultant signal generated by the digital quadrature modulation apparatus in the third embodiment of this invention. The digital quadrature demodulation apparatus has a device for selecting four successive samples of 2N-point discrete data being a quadrature-modulation-resultant signal which has a sampling frequency equal to twice the predetermined sampling frequency Fs and which is in a frequency band whose center frequency is equal to a half of the predetermined sampling frequency Fs. Also, the digital quadrature demodulation apparatus has a device for sequentially assigning the selected four successive samples to a sample I(2n) of an in-phase signal, an inversion −Q(2n) of a sample Q(2n) of a quadrature signal, an inversion −I(2n+1) of a sample I(2n+1) of the in-phase signal, and a sample Q(2n+1) of the quadrature signal, respectively. Each of the in-phase signal and the quadrature signal has N points, and is in a frequency band whose center frequency is equal to 0 Hz.

Figure 10:
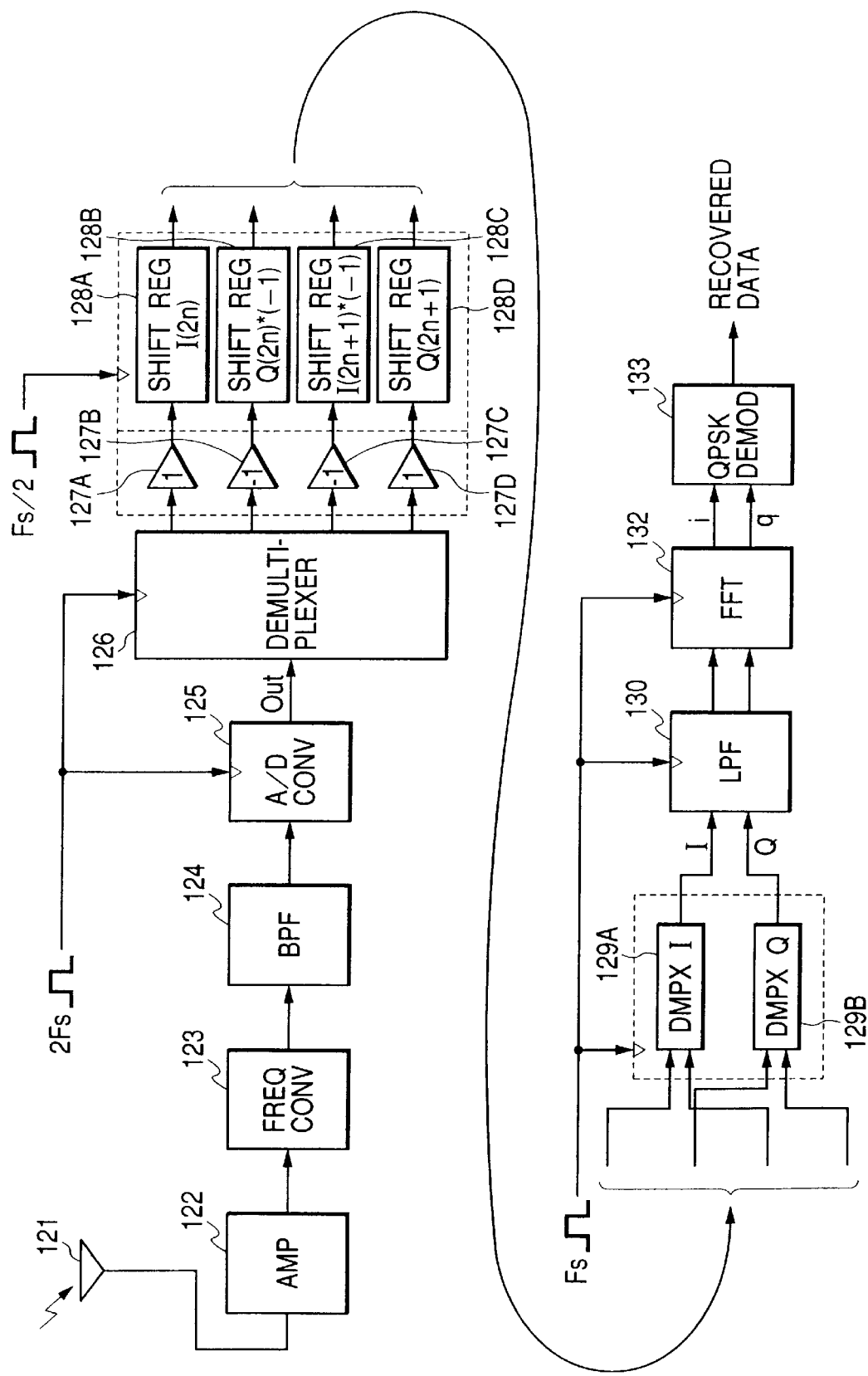
FIG. 10 is a block diagram of an OFDM demodulation apparatus according to a fourth embodiment of this invention.

FIG. 10 shows the OFDM demodulation apparatus according to the fourth embodiment of this invention. The OFDM demodulation apparatus of FIG. 10 is similar to the OFDM demodulation apparatus of FIG. 6 except that the phase filter 131 (see FIG. 6) is omitted.

In the OFDM demodulation apparatus of FIG. 10, an FFT section 132 follows a low pass filter 130, and receives filtering-resultant digital I and Q signals therefrom. The FFT section 132 subjects the filtering-resultant digital I and Q signals to FFT, thereby converting the filtering-resultant digital I and Q signals into FFT-resultant real-part digital signals and FFT-resultant imaginary-part digital signals corresponding to orthogonal baseband carrier frequencies. The FFT section 132 outputs the FFT-resultant real-part digital signals as digital I signals. The FFT section 132 outputs the FFT-resultant imaginary-part digital signals as digital Q signals.

It should be noted that the OFDM demodulation apparatus in FIG. 10 can demodulate an OFDM signal generated by a prior-art OFDM modulation apparatus or an OFDM modulation apparatus in one of embodiments of this invention.

Fifth Embodiment

Prior-art digital quadrature modulators will be explained below for a better understanding of a fifth embodiment of this invention.

Figure 11:
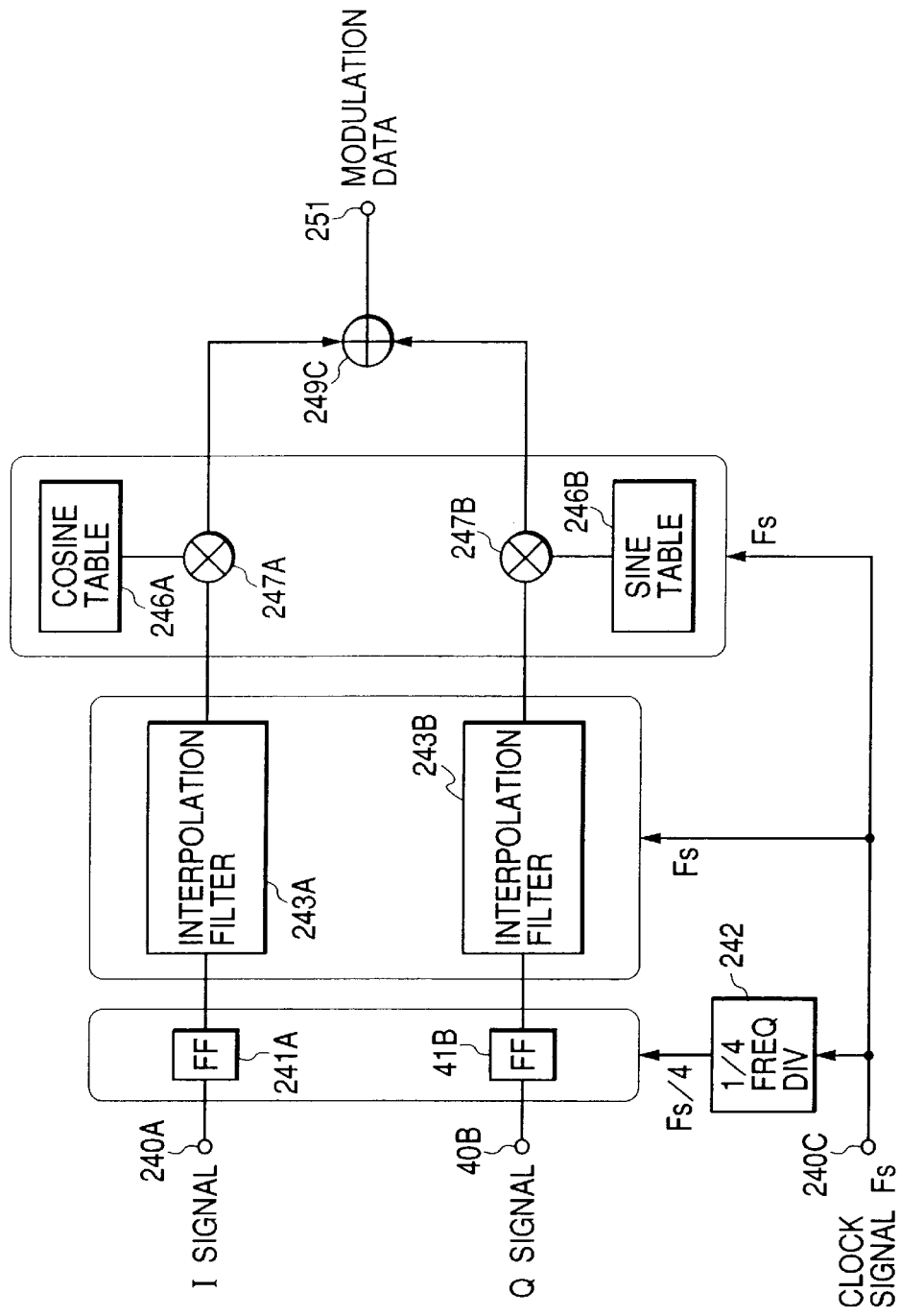
FIG. 11 is a block diagram of a first prior-art digital quadrature modulator.

FIG. 11 shows a first prior-art digital quadrature modulator which includes input terminals 240A and 240B, and flip-flop (FF) circuits 241A and 241B. A digital I signal is fed to the flip-flop circuit 241A via the input terminal 240A. A digital Q signal is fed to the flip-flop circuit 241B via the input terminal 240B.

The prior-art digital quadrature modulator of FIG. 11 includes an input terminal 240C and a frequency divider 242. A high-frequency clock signal having a predetermined frequency Fs is fed to the frequency divider 242 via the input terminal 240C. The device 242 divides the frequency of the high-frequency clock signal by 4, thereby generating a low-frequency clock signal having a frequency Fs/4 equal to one fourth of the predetermined frequency Fs. The frequency divider 242 feeds the low-frequency clock signal to the flip-flop circuits 241A and 241B as a low-frequency sampling clock signal.

The flip-flop circuit 241A periodically samples the digital I signal in response to the low-frequency sampling clock signal. The flip-flop circuit 241A sequentially outputs resultant samples of the digital I signal to an interpolation filter 243A. The flip-flop circuit 241B periodically samples the digital Q signal in response to the low-frequency sampling clock signal. The flip-flop circuit 241B sequentially outputs resultant samples of the digital Q signal to an interpolation filter 243B.

The interpolation filter 243A receives the high-frequency clock signal via the input terminal 240C. The interpolation filter 243A acts an up-sampler responsive to the high-frequency clock signal for increasing (for example, quadrupling) the sampling frequency of the digital I signal outputted from the flip-flop circuit 241A. Specifically, the interpolation filter 243A generates second samples from original samples of the digital I signal by an interpolation process. The interpolation filter 243A combines the second samples and the original samples into a sequence of samples of an interpolation-resultant digital I signal. The interpolation circuit 243A outputs the interpolation-resultant digital I signal to a multiplier 247A.

The interpolation filter 243B receives the high-frequency clock signal via the input terminal 240C. The interpolation filter 243B acts an up-sampler responsive to the high-frequency clock signal for increasing (for example, quadrupling) the sampling frequency of the digital Q signal outputted from the flip-flop circuit 241B. Specifically, the interpolation filter 243B generates second samples from original samples of the digital Q signal by an interpolation process. The interpolation filter 243B combines the second samples and the original samples into a sequence of samples of an interpolation-resultant digital Q signal. The interpolation circuit 243B outputs the interpolation-resultant digital Q signal to a multiplier 247B.

The prior-art digital quadrature modulator of FIG. 11 includes a ROM 246A storing data representing a cosine table. The cosine-table data correspond to a digital cosine wave. The ROM 246A receives the high-frequency clock signal via the input terminal 240C. The ROM 246A outputs the digital cosine wave to the multiplier 247A in response to the high-frequency clock signal. The digital cosine wave periodically changes as "1"→"0"→"−1"→"0". The device 247A multiplies the interpolation-resultant digital I signal and the digital cosine wave, thereby generating a multiplication-resultant digital I signal. The multiplier 247A outputs the multiplication-resultant digital I signal to an adder 249C.

The prior-art digital quadrature modulator of FIG. 11 includes a ROM 246B storing data representing a sine table. The sine-table data correspond to a digital sine wave. The ROM 246B receives the high-frequency clock signal via the input terminal 240C. The ROM 246B outputs the digital sine wave to the multiplier 247B in response to the high-frequency clock signal. The digital sine wave periodically changes as "0"→"1"→"0"→"−1". The device 247B multiplies the interpolation-resultant digital Q signal and the digital sine wave, thereby generating a multiplication-resultant digital Q signal. The multiplier 247B outputs the multiplication-resultant digital Q signal to the adder 249C.

The adder 249C acts as a multiplexer. Specifically, the adder 249C combines and multiplexes the output digital I and Q signals from the multipliers 247A and 247B into a quadrature-modulation-resultant digital signal. The adder 249C feeds the quadrature-modulation-resultant digital signal to an output terminal 251.

Figure 12:
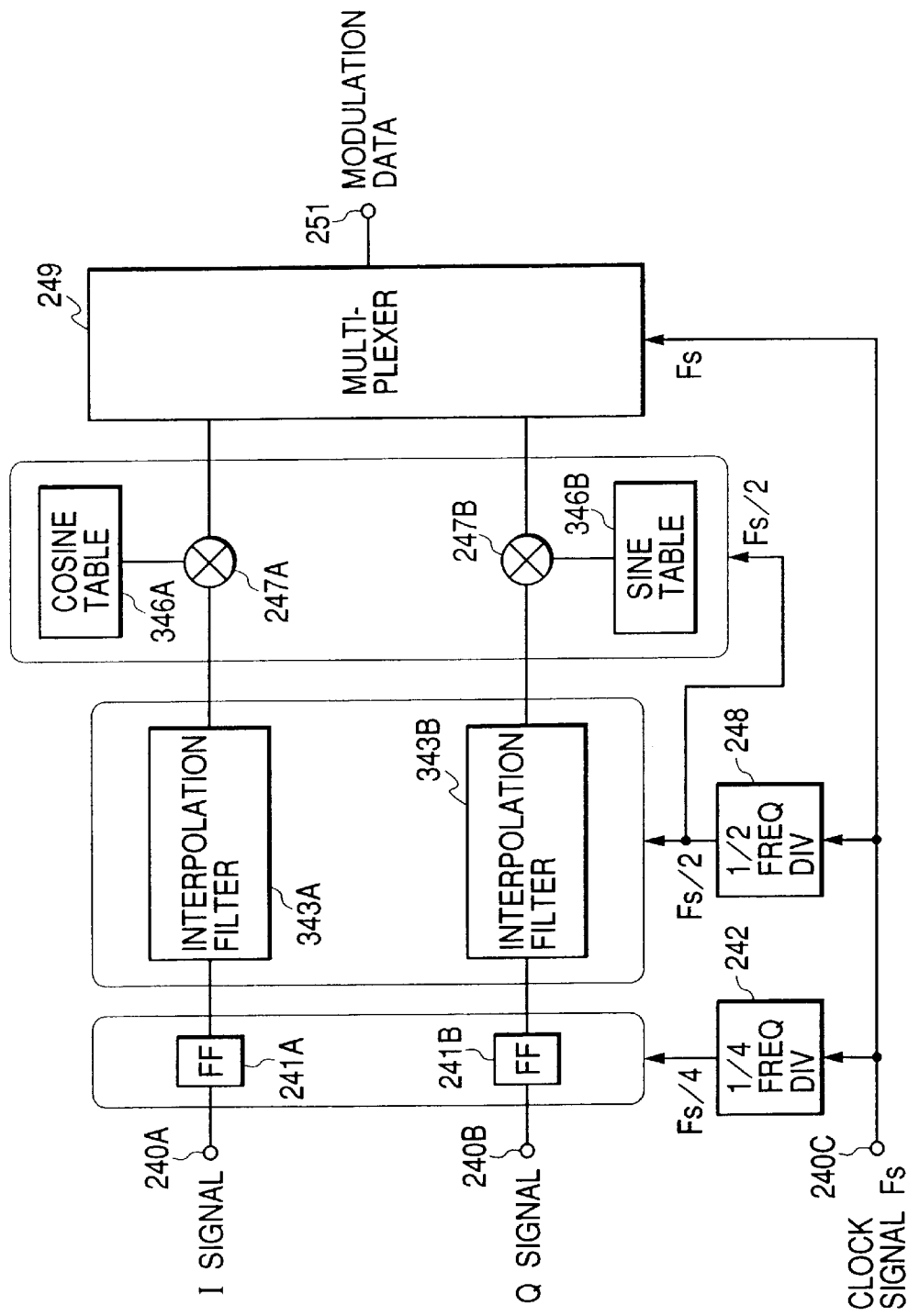
FIG. 12 is a block diagram of a second prior-art digital quadrature modulator.

FIG. 12 shows a second prior-art digital quadrature modulator which is similar to the first prior-art digital quadrature modulator (see FIG. 11) except for design changes mentioned later.

The prior-art digital quadrature modulator of FIG. 12 includes interpolation filters 343A and 343B which replace the interpolation filters 243A and 243B (see FIG. 11) respectively. The interpolation filter 343A receives a digital I signal from a flip-flop circuit 241A. The interpolation circuit 343B receives a digital Q signal from a flip-flop circuit 241B.

The prior-art digital quadrature modulator of FIG. 12 includes a frequency divider 248. The frequency divider 248 receives the high-frequency clock signal via the input terminal 240C. The device 248 divides the frequency of the high-frequency clock signal by 2, thereby generating an intermediate-frequency clock signal having a frequency Fs/2 equal to a half of the predetermined frequency Fs. The frequency divider 248 feeds the intermediate-frequency clock signal to the interpolation filters 343A and 343B.

The interpolation filter 343A acts an up-sampler responsive to the intermediate-frequency clock signal for increasing (for example, doubling) the sampling frequency of the digital I signal outputted from the flip-flop circuit 241A. Specifically, the interpolation filter 343A generates second samples from original samples of the digital I signal by an interpolation process. The interpolation filter 343A combines the second samples and the original samples into a sequence of samples of an interpolation-resultant digital I signal. The interpolation circuit 343A outputs the interpolation-resultant digital I signal to a multiplier 247A.

The interpolation filter 343B acts an up-sampler responsive to the intermediate-frequency clock signal for increasing (for example, doubling) the sampling frequency of the digital Q signal outputted from the flip-flop circuit 241B. Specifically, the interpolation filter 343B generates second samples from original samples of the digital Q signal by an interpolation process. The interpolation filter 343B combines the second samples and the original samples into a sequence of samples of an interpolation-resultant digital Q signal. The interpolation circuit 343B outputs the interpolation-resultant digital Q signal to a multiplier 247B.

The prior-art digital quadrature modulator of FIG. 12 includes a ROM 346A storing data representing a cosine table. The cosine-table data correspond to a digital cosine wave. The ROM 346A receives the intermediate-frequency clock signal from the frequency divider 248. The ROM 346A outputs the digital cosine wave to the multiplier 247A in response to the intermediate-frequency clock signal. The device 247A multiplies the interpolation-resultant digital I signal and the digital cosine wave, thereby generating a multiplication-resultant digital I signal. The multiplier 247A outputs the multiplication-resultant digital I signal to a multiplexer 249.

The prior-art digital quadrature modulator of FIG. 12 includes a ROM 346B storing data representing a sine table. The sine-table data correspond to a digital sine wave. The ROM 346B receives the intermediate-frequency clock signal from the frequency divider 248. The ROM 346B outputs the digital sine wave to the multiplier 247B in response to the intermediate-frequency clock signal. The device 247B multiplies the interpolation-resultant digital Q signal and the digital sine wave, thereby generating a multiplication-resultant digital Q signal. The multiplier 247B outputs the multiplication-resultant digital Q signal to the multiplexer 249.

The multiplexer 249 receives the high-frequency clock signal via the input terminal 240C. The multiplexer 249 combines and multiplexes the output digital I and Q signals from the multipliers 247A and 247B into a quadrature-modulation-resultant digital signal in response to the high-frequency clock signal. The multiplexer 249 feeds the quadrature-modulation-resultant digital signal to an output terminal 251.

The fifth embodiment of this invention will be described below. The fifth embodiment of this invention is directed to a digital quadrature modulator including an interpolation filter for generating second samples of an N-point quadrature signal from original samples of the quadrature signal by an interpolation process, where N denotes a predetermined natural number. The second samples are at centers between positions of the original samples. The digital quadrature modulator of the fifth embodiment of this invention further includes a first demultiplexer for separating samples of an N-point in-phase signal into a sequence of even-numbered samples and a sequence of odd-numbered samples, and a second demultiplexer for separating the second samples of the quadrature signal into a sequence of even-numbered samples and a sequence of odd-numbered samples. The sequence of the even-numbered samples of the in-phase signal compose a signal I(2n). The sequence of the odd-numbered samples of the quadrature signal compose a signal Q(2n+1). In addition, the digital quadrature modulator of the fifth embodiment of this invention includes a first multiplier for multiplying the sequence of the odd-numbered samples of the in-phase signal by "−1" to generate a signal −I(2n+1), a second multiplier for multiplying the sequence of the even-numbered samples of the quadrature signal by "−1" to generate a signal −Q(2n), and a parallel-to-serial converter for sequentially selecting and outputting the signal I(2n), the signal −Q(2n), the signal −I(2n+1), and the signal Q(2n+1) to generate a 2N-point digital quadrature-modulation-resultant signal.

Figure 13:
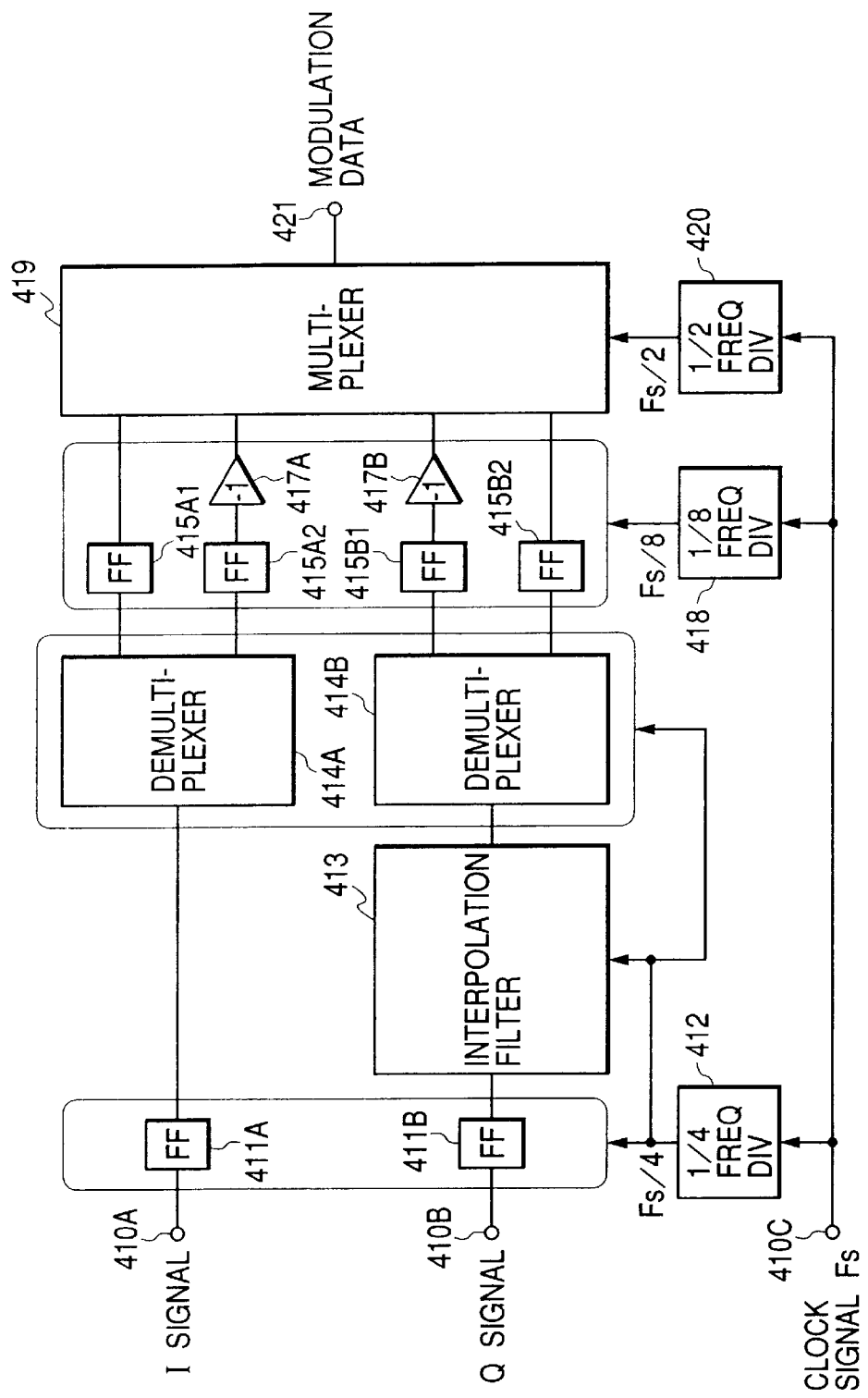
FIG. 13 is a block diagram of a digital quadrature modulator according to a fifth embodiment of this invention.

FIG. 13 shows the digital quadrature modulator according to the fifth embodiment of this invention. The digital quadrature modulator of FIG. 13 includes input terminals 410A and 410B, and flip-flop (FF) circuits 411A and 411B. A digital I signal is fed to the flip-flop circuit 411A via the input terminal 410A. A digital Q signal is fed to the flip-flop circuit 411B via the input terminal 410B.

The digital quadrature modulator of FIG. 13 includes an input terminal 410C and a frequency divider 412. A high-frequency clock signal having a predetermined frequency Fs is fed to the frequency divider 412 via the input terminal 410C. The high-frequency clock signal having the predetermined frequency Fs is also referred to as the Fs-frequency clock signal. The device 412 divides the frequency of the high-frequency clock signal (the Fs-frequency clock signal) by 4, thereby generating an Fs/4-frequency clock signal having a frequency equal to one fourth of the predetermined frequency Fs. The frequency divider 412 feeds the Fs/4-frequency clock signal to the flip-flop circuits 411A and 411B as an Fs/4-frequency sampling clock signal.

The flip-flop circuit 411A periodically samples the digital I signal in response to the Fs/4-frequency sampling clock signal. The flip-flop circuit 411A sequentially outputs resultant samples of the digital I signal to a demultiplexer 414A. The flip-flop circuit 411B periodically samples the digital Q signal in response to the Fs/4-frequency sampling clock signal. The flip-flop circuit 411B sequentially outputs resultant samples of the digital Q signal to an interpolation filter 413.

The interpolation filter 413 receives the Fs/4-frequency clock signal from the frequency divider 412. Alternatively, the interpolation filter 413 may receive an Fs/2-frequency clock signal from a frequency divider 420 mentioned later. The interpolation filter 413 includes first and second sections. The first section acts as an up-sampler responsive to the Fs/4-frequency clock signal or the Fs/2-frequency clock signal for doubling the sampling frequency of the digital Q signal outputted from the flip-flop circuit 411B. The second section acts as a down-sampler responsive to the Fs/4-frequency clock signal or the Fs/2-frequency clock signal for halving the sampling frequency of the digital Q signal outputted from the first section. Specifically, the interpolation filter 413 generates second samples from original samples of the digital Q signal by an interpolation process. The second samples are defined at center points between the positions of the original samples. The interpolation filter 413 discards the original samples, and sequentially outputs only the second samples to a demultiplexer 414B as an interpolation-resultant digital Q signal.

The interpolation filter 413 may include a phase shifter for providing a phase shift of 90° to the digital Q signal outputted from the flip-flop circuit 411B. The interpolation filter 413 may include a half band filter. The interpolation filter 413 may be used as the phase filter 23 in FIG. 4.

The demultiplexer 414A receives the Fs/4-frequency clock signal from the frequency divider 412. The demultiplexer 414A rearranges samples of the output digital I signal from the flip-flop circuit 411A into a sequence of even-numbered samples and a sequence of odd-numbered samples. The demultiplexer 414A outputs the sequence of even-numbered samples, that is, the even-sample digital I signal, to a flip-flop (FF) circuit 415A1. The demultiplexer 414A outputs the sequence of odd-numbered samples, that is, the odd-sample digital I signal, to a flip-flop circuit 415A2.

The demultiplexer 414B receives the Fs/4-frequency clock signal from the frequency divider 412. The demultiplexer 414B rearranges samples of the output digital Q signal from the interpolation filter 413 into a sequence of even-numbered samples and a sequence of odd-numbered samples. The demultiplexer 414B outputs the sequence of even-numbered samples, that is, the even-sample digital Q signal, to a flip-flop (FF) circuit 415B1. The demultiplexer 414B outputs the sequence of odd-numbered samples, that is, the odd-sample digital Q signal, to a flip-flop (FF) circuit 415B2.

The digital quadrature modulator of FIG. 13 includes a frequency divider 418 which receives the Fs-frequency clock signal via the input terminal 410C. The device 418 divides the frequency of the Fs-frequency clock signal by 8, thereby generating an Fs/8-frequency clock signal having a frequency equal to one eighth of the predetermined frequency Fs. The frequency divider 418 feeds the Fs/8-frequency clock signal to the flip-flop circuits 415A1, 415A2, 415B1, and 415B2 as an Fs/8-frequency sampling clock signal.

The flip-flop circuit 415A1 periodically samples the even-sample digital I signal in response to the Fs/8-frequency sampling clock signal. The flip-flop circuit 415A1 sequentially outputs resultant samples of the even-sample digital I signal to a multiplexer 419. The samples of the output digital I signal from the flip-flop circuit 415A1 are at a phase point of 0° (0).

The flip-flop circuit 415A2 periodically samples the odd-sample digital I signal in response to the Fs/8-frequency sampling clock signal. The flip-flop circuit 415A2 sequentially outputs resultant samples of the odd-sample digital I signal to a multiplier 417A. The samples of the output digital I signal from the flip-flop circuit 415A2 are at a phase point of 180° ($\pi$). The device 417A multiplies the odd-sample digital I signal (the output signal from the flip-flop circuit 415A2) by "−1". The multiplier 417A outputs the multiplication-resultant odd-sample digital I signal to the multiplexer 419.

The flip-flop circuit 415B1 periodically samples the even-sample digital Q signal in response to the Fs/8-frequency sampling clock signal. The flip-flop circuit 415B1 sequentially outputs resultant samples of the even-sample digital Q signal to a multiplier 417B. The samples of the output digital Q signal from the flip-flop circuit 415B1 are at a phase point of 90° ($\pi/2$). The device 417B multiplies the even-sample digital Q signal (the output signal from the flip-flop circuit 415B1) by "−1". The multiplier 417B outputs the multiplication-resultant even-sample digital Q signal to the multiplexer 419.

The flip-flop circuit 415B2 periodically samples the odd-sample digital Q signal in response to the Fs/8-frequency sampling clock signal. The flip-flop circuit 415B2 sequentially outputs resultant samples of the odd-sample digital Q signal to the multiplexer 419. The samples of the output digital Q signal from the flip-flop circuit 415B2 are at a phase point of 270° ($3\pi/2$).

The digital quadrature modulator of FIG. 13 includes a frequency divider 420 which receives the Fs-frequency clock signal via the input terminal 410C. The device 420 halves the frequency of the Fs-frequency clock signal, thereby generating an Fs/2-frequency clock signal having a frequency equal to a half of the predetermined frequency Fs. The frequency divider 420 feeds the Fs/2-frequency clock signal to the multiplexer 419.

The multiplexer 419 combines and multiplexes the even-sample digital I signal (Ieven), the multiplication-resultant odd-sample digital I signal (−Iodd), the multiplication-resultant even-sample digital Q signal (−Qeven), and the odd-sample digital Q signal (Qodd) into a quadrature-modulation-resultant digital signal in response to the Fs/2-frequency clock signal. Samples of the quadrature-modulation digital signal are arranged in the order as "Ieven→−Qeven→−Iodd→Qodd". The multiplexer 419 feeds the quadrature-modulation digital signal to an output terminal 421. The multiplexer 419 includes, for example, a parallel-to-serial converter.

Sixth Embodiment

FIG. 14 shows a digital quadrature modulator according to a sixth embodiment of this invention. The digital quadrature modulator of FIG. 14 is similar to the digital quadrature modulator of FIG. 13 except for design changes mentioned hereinafter.

The digital quadrature modulator of FIG. 14 includes an input terminal 410C, a frequency divider 412C, and a multiplexer 419. A clock signal having a half of a predetermined frequency Fs is fed to the frequency divider 412C and the multiplexer 419 via the input terminal 410C. The clock signal having a half of the predetermined frequency Fs is also referred to as the Fs/2-frequency clock signal. The device 412C halves the frequency of the Fs/2-frequency clock signal, thereby generating an Fs/4-frequency clock signal having a frequency equal to one fourth of the predetermined frequency Fs. The frequency divider 412C feeds the Fs/4-frequency clock signal to flip-flop circuits 411A and 411B as an Fs/4-frequency sampling clock signal. Also, the frequency divider 412C feeds the Fs/4-frequency clock signal to an interpolation filter 413. Alternatively, the interpolation filter 413 may receive the Fs/2-frequency clock signal via the input terminal 410C.

The digital quadrature modulator of FIG. 14 includes a frequency divider 418C which receives the Fs/2-frequency clock signal via the input terminal 410C. The device 418C divides the frequency of the Fs/2-frequency clock signal by 4, thereby generating an Fs/8-frequency clock signal having a frequency equal to one eighth of the predetermined frequency Fs. The frequency divider 418C feeds the Fs/8-frequency clock signal to flip-flop circuits 415A1, 415A2, 415B1, and 415B2 as an Fs/8-frequency sampling clock signal.

Seventh Embodiment

FIG. 15 shows a digital quadrature modulator according to a seventh embodiment of this invention. The digital quadrature modulator of FIG. 15 is similar to the digital quadrature modulator of FIG. 13 except for design changes mentioned hereinafter.

In the digital quadrature modulator of FIG. 15, the interpolation filter 413 (see FIG. 13) is omitted, and a flip-flop circuit 411B is directly connected to a demultiplexer 414B. Thus, an output signal of the flip-flop circuit 411B is fed directly to the demultiplexer 414B.

The digital quadrature modulator of FIG. 15 includes an interpolation filter 480 connected between a flip-flop circuit 411A and a demultiplexer 414A.

The interpolation filter 480 receives an Fs/4-frequency clock signal from a frequency divider 412. Alternatively, the interpolation filter 480 may receive an Fs/2-frequency clock signal from a frequency divider 420. The interpolation filter 480 includes first and second sections. The first section acts an up-sampler responsive to the Fs/4-frequency clock signal or the Fs/2-frequency clock signal for doubling the sampling frequency of a digital I signal outputted from the flip-flop circuit 411A. The second section acts as a down-sampler responsive to the Fs/4-frequency clock signal or the Fs/2-frequency clock signal for halving the sampling frequency of the digital I signal outputted from the first section. Specifically, the interpolation filter 480 generates second samples from original samples of the digital I signal by an interpolation process. The second samples are defined at center points between the positions of the original samples. The interpolation filter 480 discards the original samples, and sequentially outputs only the second samples to the demultiplexer 414A as an interpolation-resultant digital I signal.

The interpolation filter 480 may include a phase shifter for providing a phase shift of 90° to the digital I signal outputted from the flip-flop circuit 411A. The interpolation filter 480 may include a half band filter.

What is claimed is:

1. A method of modulation based on orthogonal frequency division multiplexing, comprising the steps of:

assigning data pieces representative of in-phase components and quadrature components of a digital-modulation-resultant signal to frequencies for inverse fast Fourier transform;

executing the inverse fast Fourier transform at a predetermined sampling frequency Fs to convert the data pieces into a real-part signal and an imaginary-part signal;

shifting phases of the real-part signal and the imaginary-part signal to convert the real-part signal and the imaginary-part signal into a phase-shifted real-part signal and a phase-shifted imaginary-part signal;

dividing the phase-shifted real-part signal into a sequence of even-numbered samples and a sequence of odd-numbered samples;

dividing the phase-shifted imaginary-part signal into a sequence of even-numbered samples and a sequence of odd-numbered samples;

multiplying the sequence of the even-numbered samples of the phase-shifted real-part signal by "1" to generate a first multiplication-result signal I(2n);

multiplying the sequence of the even-numbered samples of the phase-shifted imaginary-part signal by "−1" to generate a second multiplication-result signal −Q(2n);

multiplying the sequence of the odd-numbered samples of the phase-shifted real-part signal by "−1" to generate a third multiplication-result signal −I(2n+1);

multiplying the sequence of the odd-numbered samples of the phase-shifted imaginary-part signal by "1" to generate a fourth multiplication-result signal Q(2n+1);

sequentially selecting the first multiplication-result signal I(2n), the second multiplication-result signal −Q(2n), the third multiplication-result signal −I(2n+1), and the fourth multiplication-result signal Q(2n+1) at a frequency equal to twice the predetermined sampling frequency Fs to generate a digital quadrature-modulation-resultant signal; and converting the digital quadrature-modulation-resultant signal into an analog quadrature-modulation-resultant signal at a frequency equal to twice the predetermined sampling frequency Fs.

2. A method as recited in claim 1, wherein the sequentially selecting step comprises:

inputting the first multiplication-result signal I(2n), the second multiplication-result signal −Q(2n), the third multiplication-result signal −I(2n+1), and the fourth multiplication-result signal Q(2n+1) into shift registers respectively at a frequency equal to half the predetermined sampling frequency Fs; and sequentially selecting output signals from the shift registers at a frequency equal to twice the predetermined sampling frequency Fs to generate the digital quadrature-modulation-resultant signal.

3. An apparatus for modulation based on orthogonal frequency division multiplexing, comprising:

means for assigning data pieces representative of in-phase components and quadrature components of a digital-modulation-resultant signal to frequencies for inverse fast Fourier transform;

means for executing the inverse fast Fourier transform at a predetermined sampling frequency Fs to convert the data pieces into a real-part signal and an imaginary-part signal;

means for shifting phases of the real-part signal and the imaginary-part signal to convert the real-part signal and the imaginary-part signal into a phase-shifted real-part signal and a phase-shifted imaginary-part signal;

means for dividing the phase-shifted real-part signal into a sequence of even-numbered samples and a sequence of odd-numbered samples;

means for dividing the phase-shifted imaginary-part signal into a sequence of even-numbered samples and a sequence of odd-numbered samples;

a multiplier for multiplying the sequence of the even-numbered samples of the phase-shifted real-part signal by "1" to generate a first multiplication-result signal I(2n);

a multiplier for multiplying the sequence of the even-numbered samples of the phase-shifted imaginary-part signal by "−1" to generate a second multiplication-result signal −Q(2n);

a multiplier for multiplying the sequence of the odd-numbered samples of the phase-shifted real-part signal by "−1" to generate a third multiplication-result signal −I(2n+1);

a multiplier for multiplying the sequence of the odd-numbered samples of the phase-shifted imaginary-part signal by "1" to generate a fourth multiplication-result signal Q(2n+1);

means for sequentially selecting the first multiplication-result signal I(2n), the second multiplication-result signal −Q(2n), the third multiplication-result signal −I(2n+1), and the fourth multiplication-result signal Q(2n+1) at a frequency equal to twice the predetermined sampling frequency Fs to generate a digital signal; and a D/A converter for converting the digital quadrature-modulation-resultant signal into an analog quadrature-modulation-resultant signal at a frequency equal to twice the predetermined sampling frequency Fs.

4. An apparatus as recited in claim 3, wherein the sequentially selecting means comprises:

shift registers;

means for inputting the first multiplication-result signal I(2n), the second multiplication-result signal −Q(2n), the third multiplication-result signal −I(2n+1), and the fourth multiplication-result signal Q(2n+1) into the shift registers respectively at a frequency equal to half the predetermined sampling frequency Fs; and a data selector for sequentially selecting output signals from the shift registers at a frequency equal to twice the predetermined sampling frequency Fs to generate the digital quadrature-modulation-resultant signal.

* * * * *